Feb. 13, 1923.
J. F. JOY.
COAL LOADING MACHINE.
FILED MAY 28, 1918.
1,445,084.
16 SHEETS—SHEET 2.
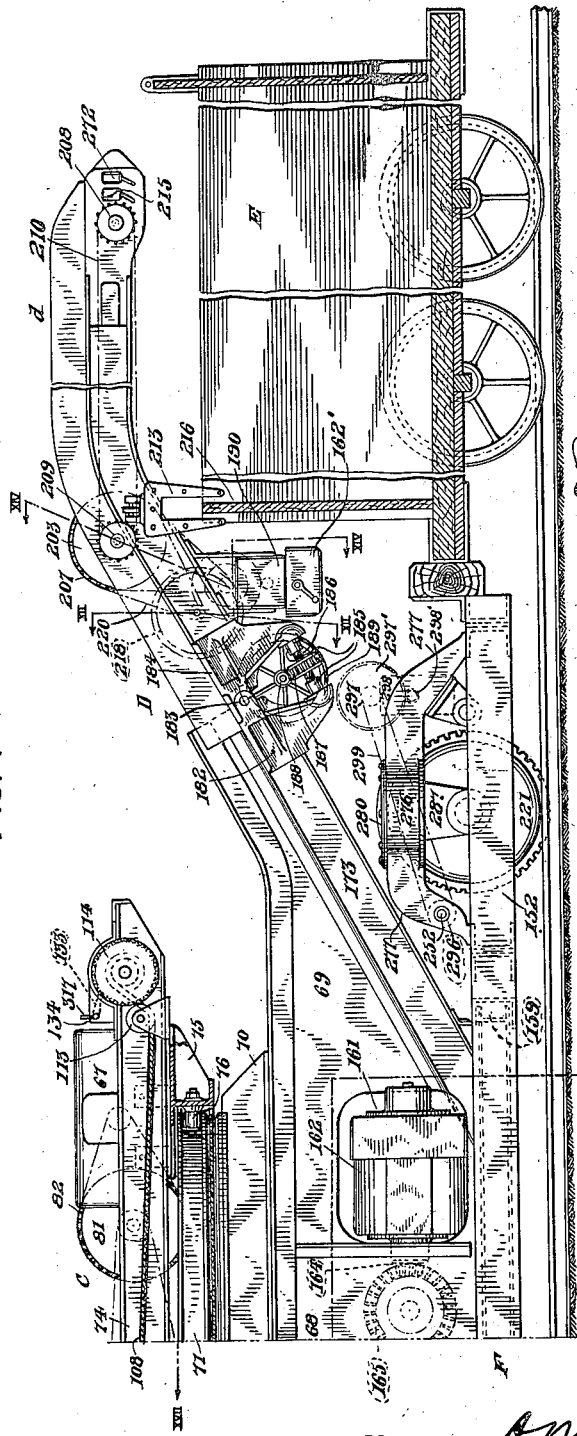
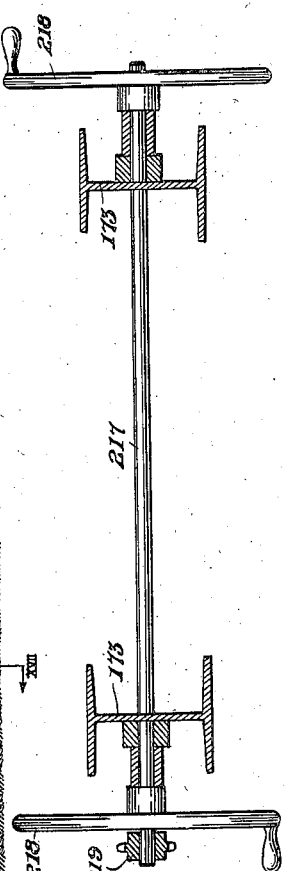
Inventor
J. F. Joy
By A. M. Wilson
Attorney Feb. 13, 1923.
J. F. JOY.
COAL LOADING MACHINE.
FILED MAY 28, 1918.
1,445,084.
16 SHEETS—SHEET 3.
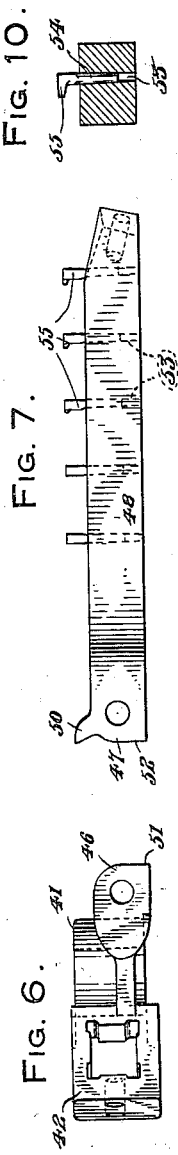
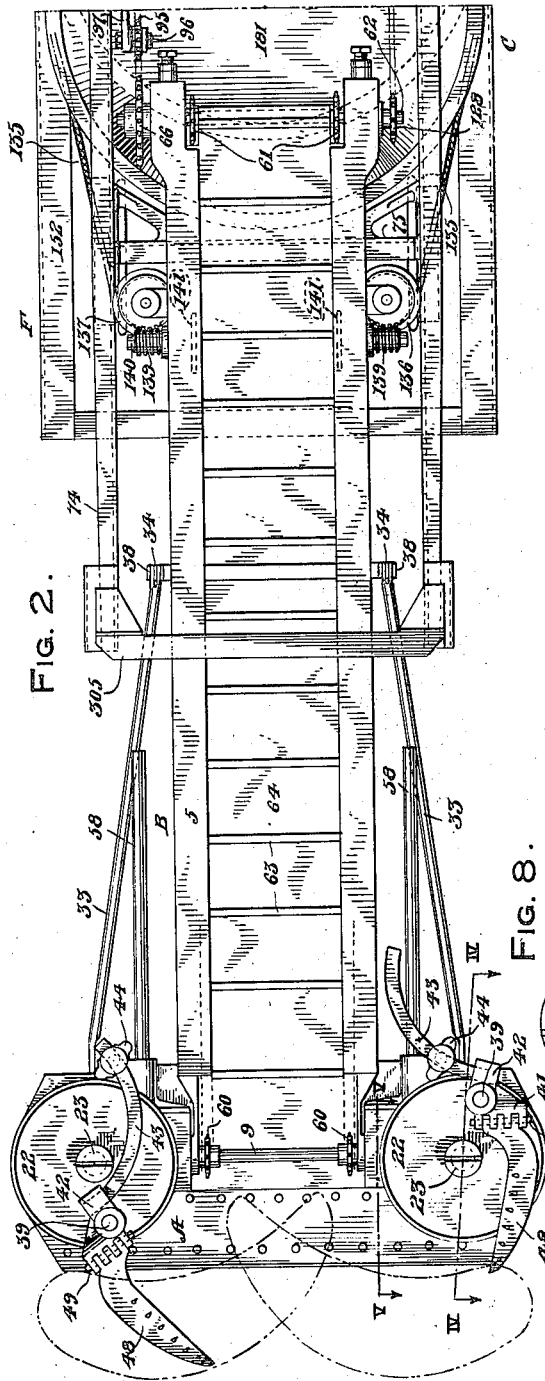
Inventor
J. F. Joy
By A. M. Wilson
Attorney

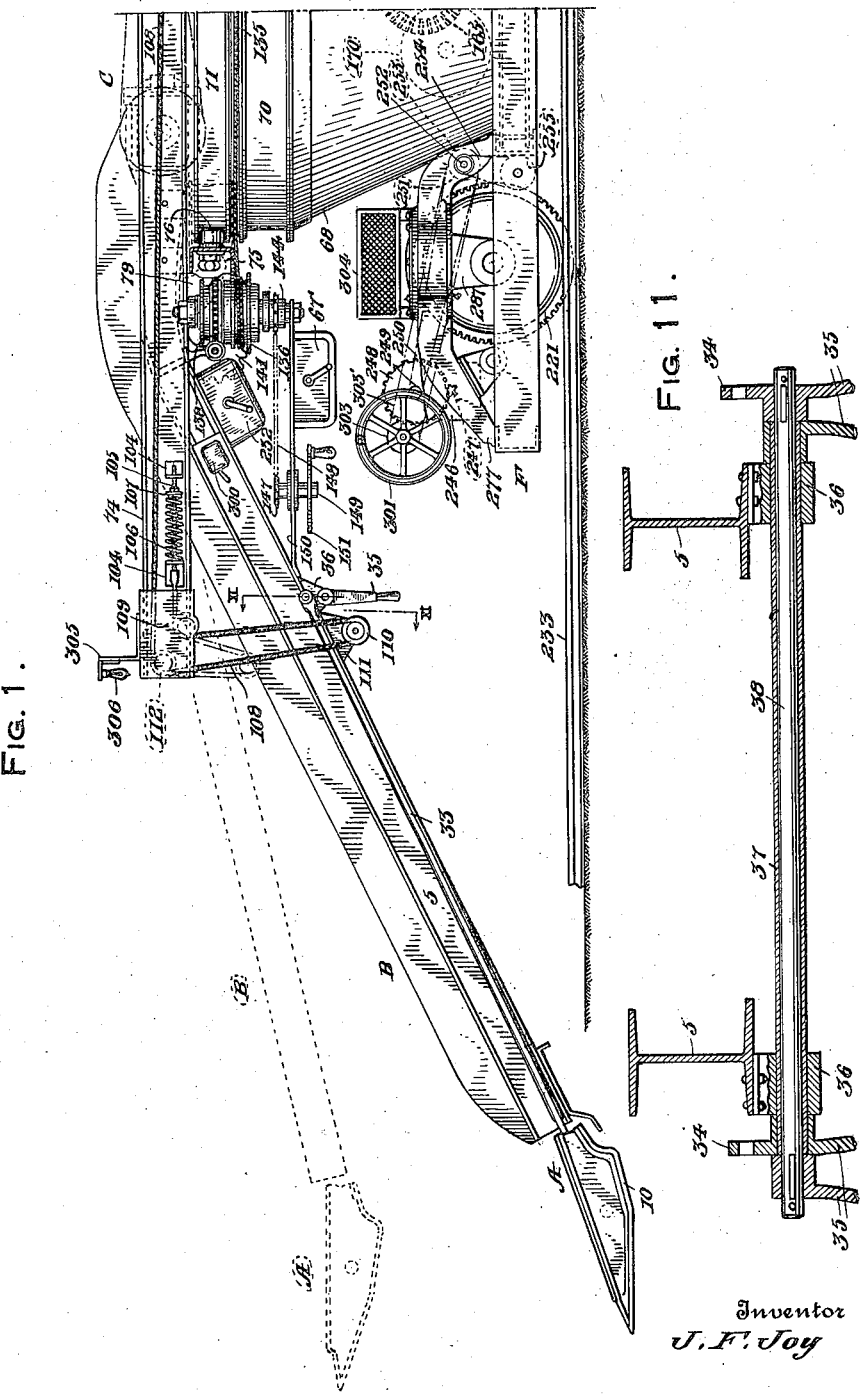

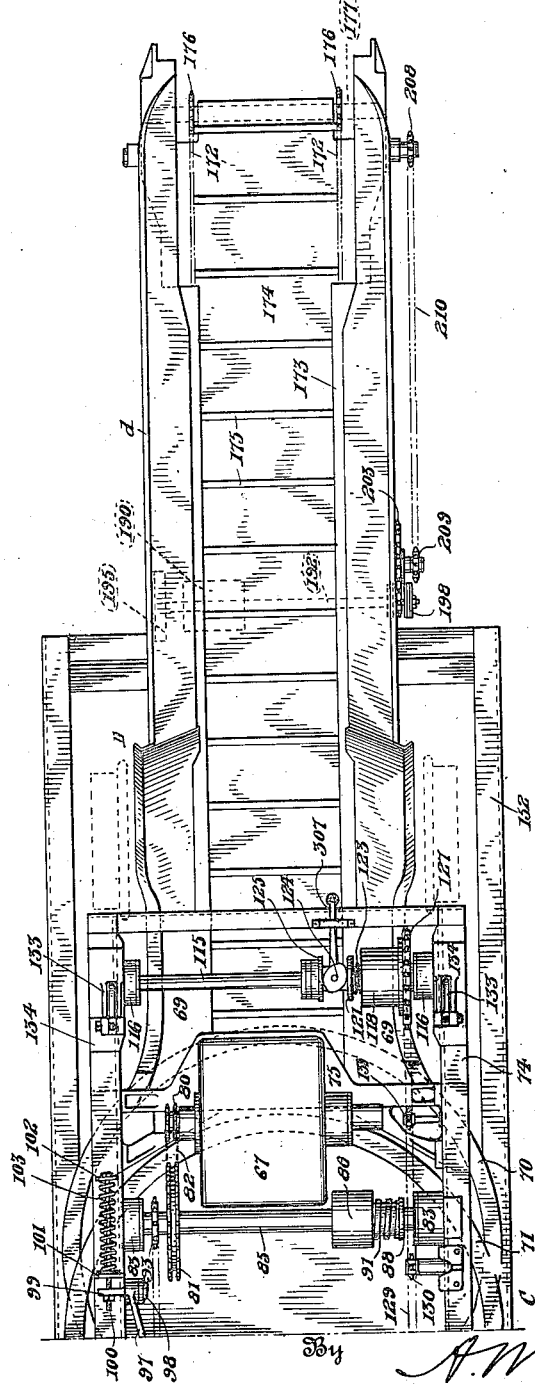

Feb. 13, 1923.
J. F. JOY.
COAL LOADING MACHINE.
FILED MAY 28, 1918.
1,445,084.
16 SHEETS—SHEET 5.
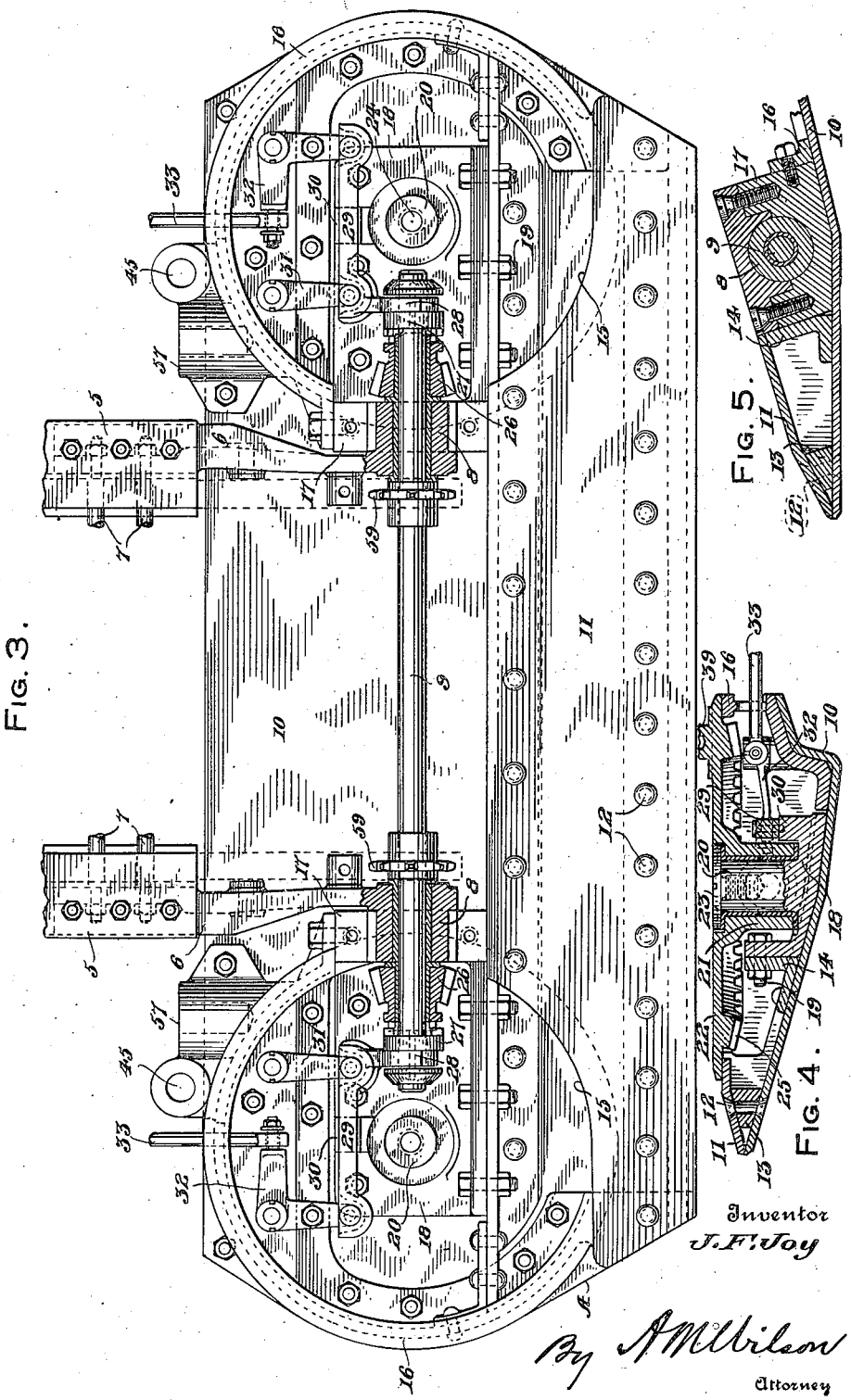
Inventor
J. F. Joy
By A. M. Wilson
Attorney

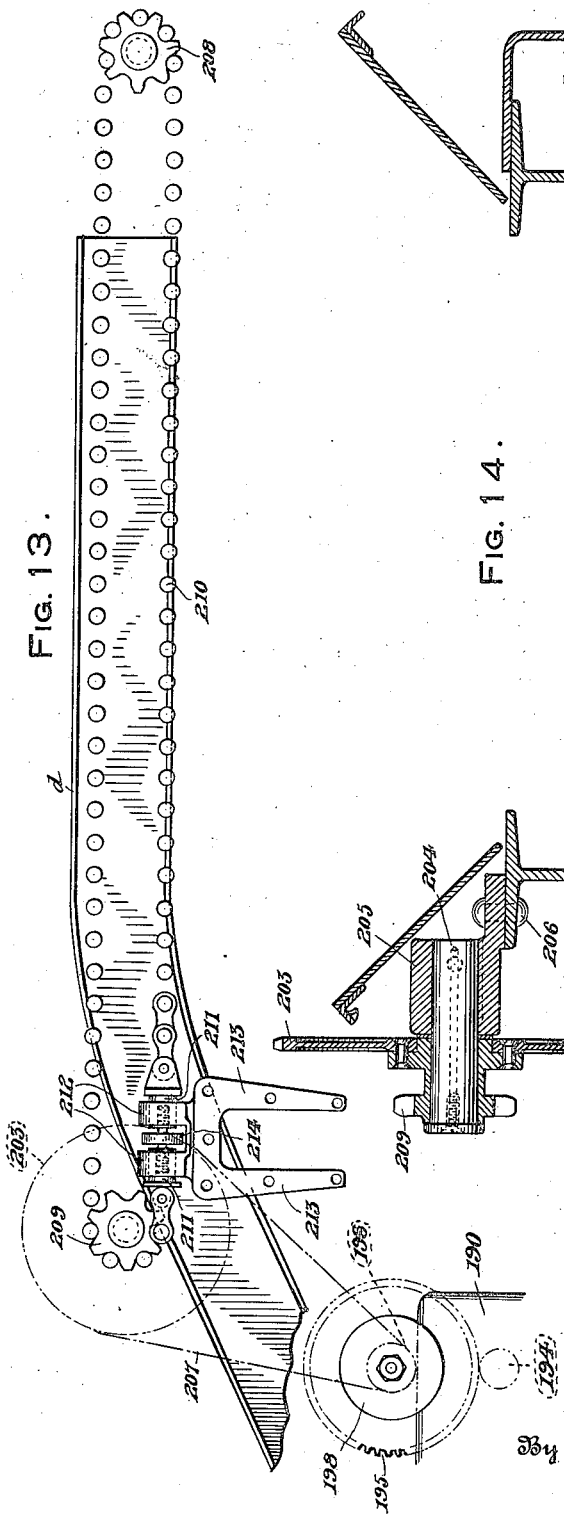
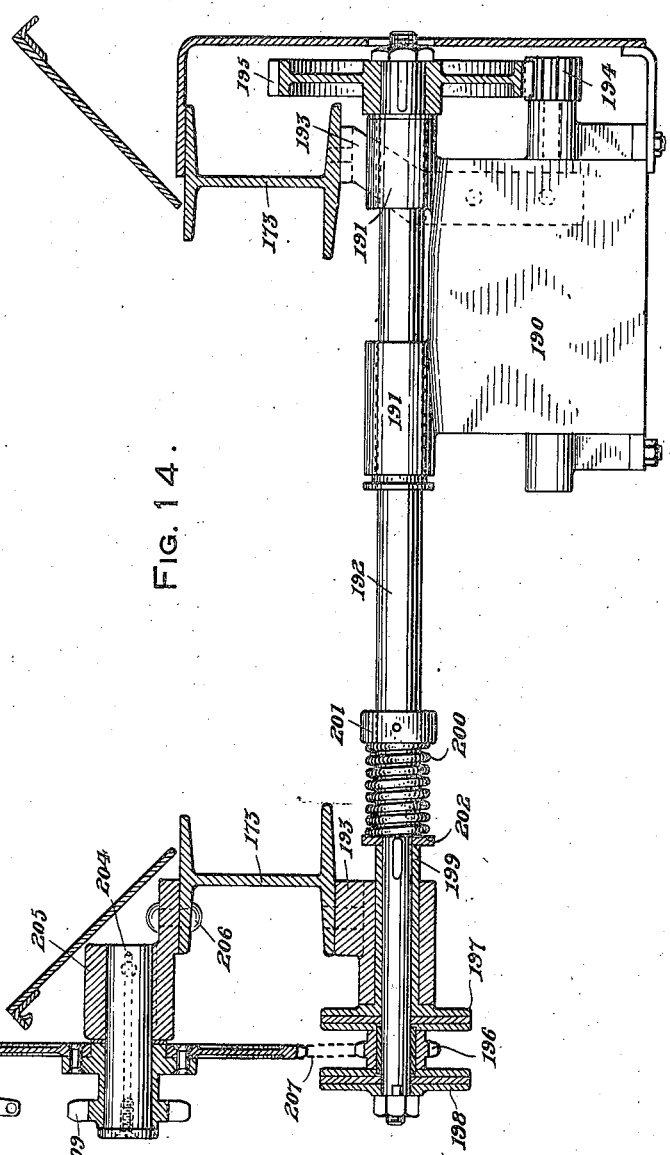

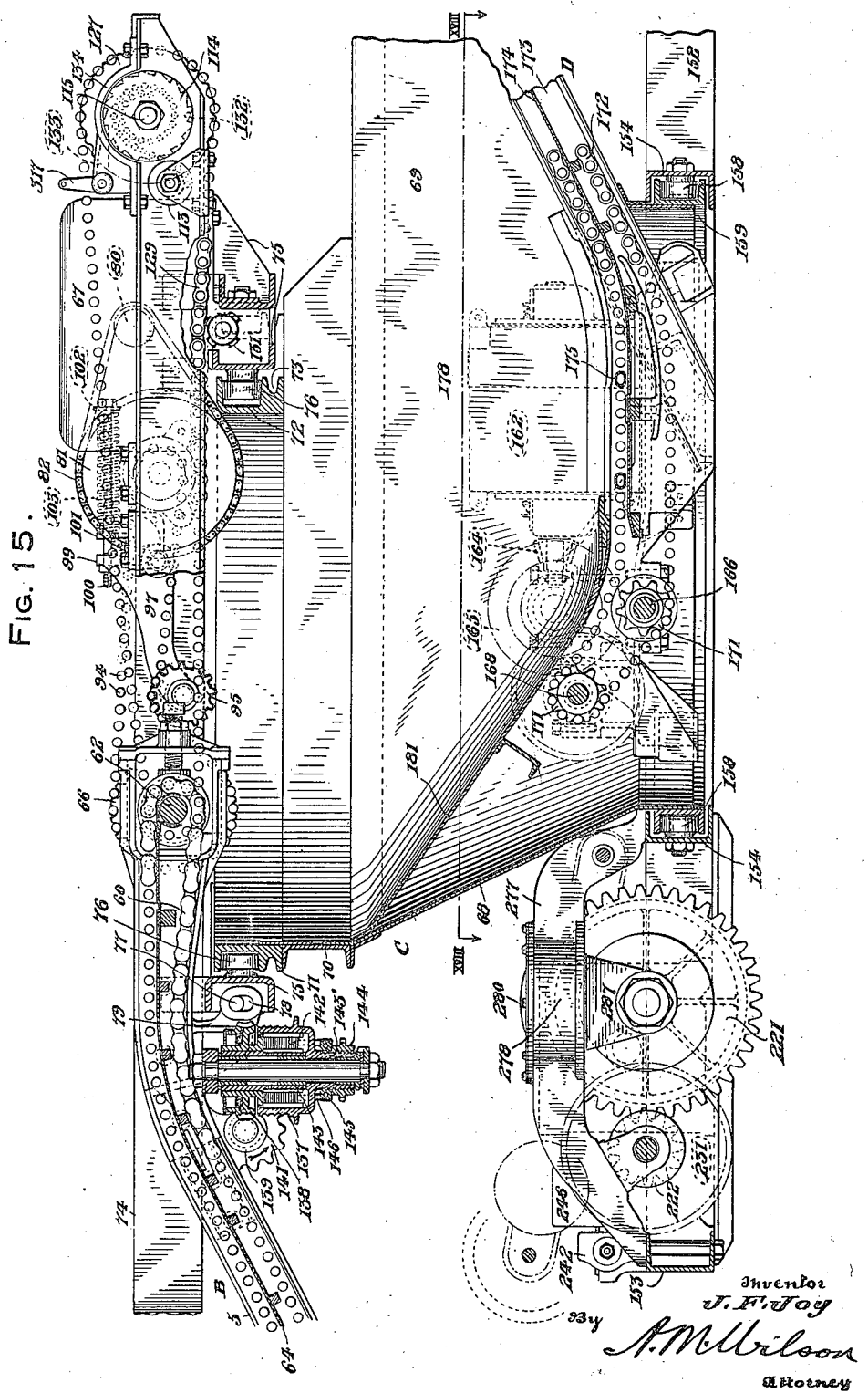

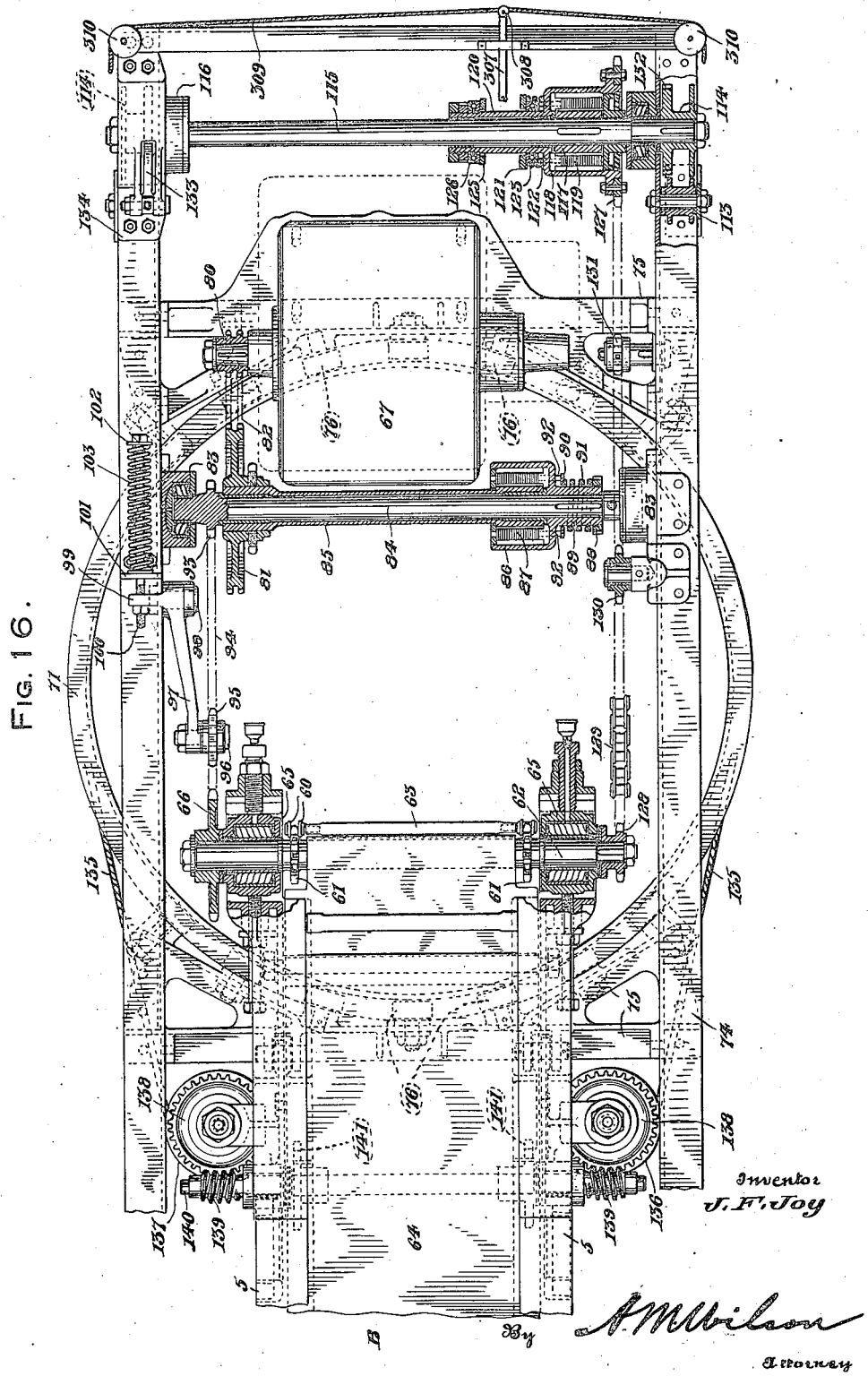

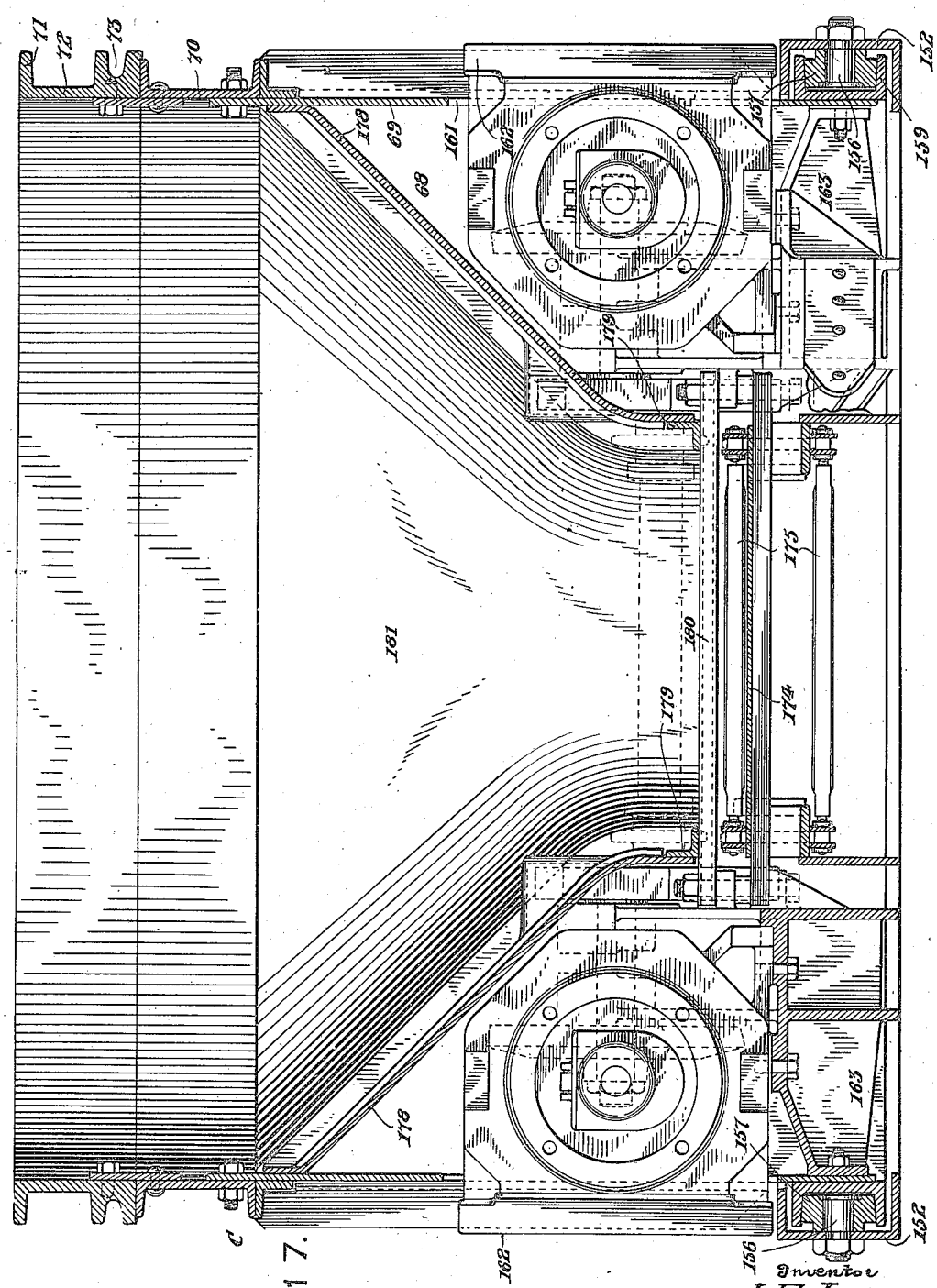

Feb. 13, 1923. 1,445,084.
J. F. JOY.
COAL LOADING MACHINE.
FILED MAY 28, 1918.
16 SHEETS—SHEET 15.
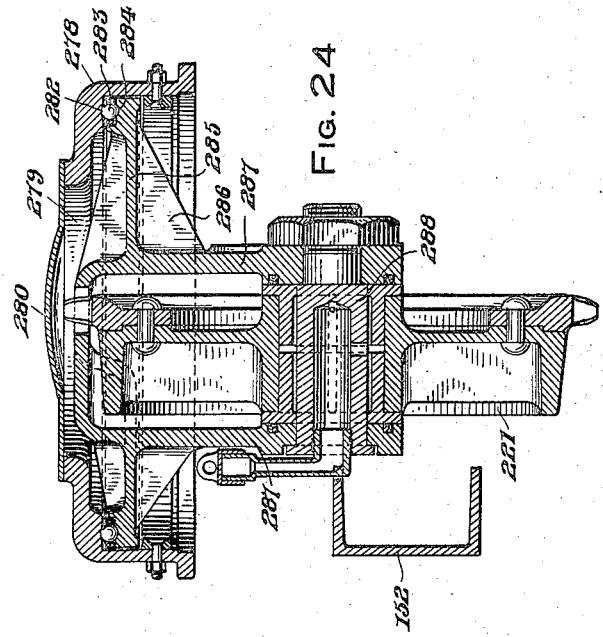
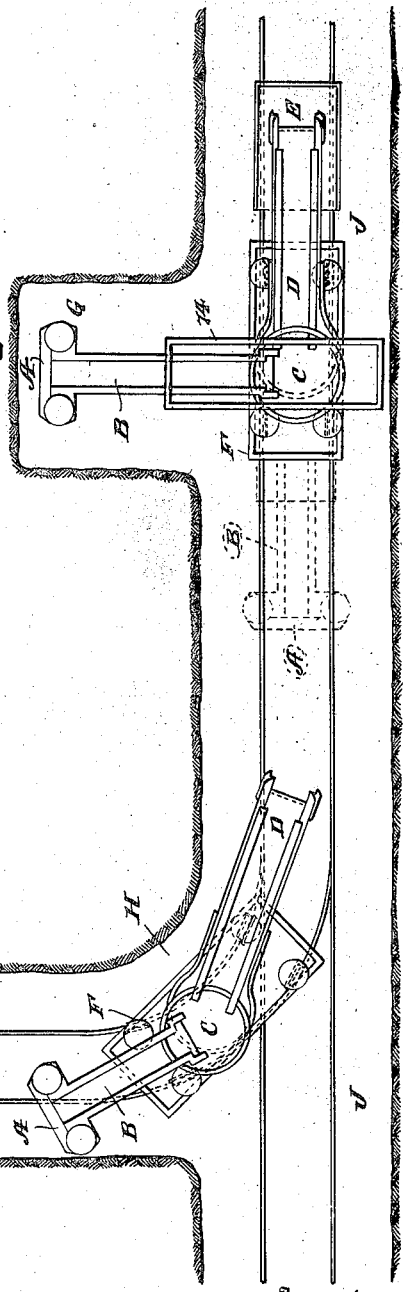
Inventor
J. F. Joy
By A. M. Wilson
Attorney

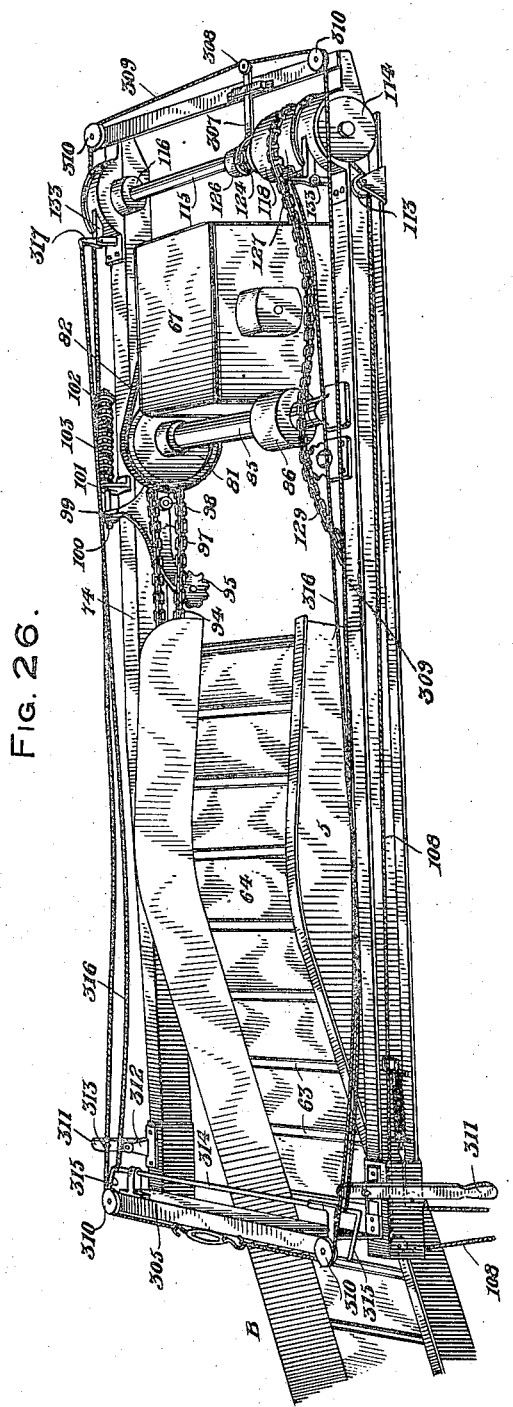

Patented Feb. 13, 1923.

1,445,084

UNITED STATES PATENT OFFICE.

JOSEPH F. JOY, OF BELLE VERNON, PENNSYLVANIA, ASSIGNOR TO JOY MACHINE COMPANY, OF PITTSBURGH, PENNSYLVANIA, A CORPORATION OF DELAWARE.

COAL-LOADING MACHINE.

Application filed May 28, 1918. Serial No. 237,111.

*To all whom it may concern:*

Be it known that I, JOSEPH F. JOY, a citizen of the United States of America, residing at Belle Vernon, in the county of Fayette and State of Pennsylvania, have invented certain new and useful Improvements in Coal-Loading Machines, of which the following is a specification.

This invention relates to certain new and useful improvements in coal loading machines, and more particularly in that class of loading machines adapted to transfer coal from the mine floor to conveniently placed cars for transportation from the mine, an example of which is disclosed in my pending application Serial Number 132,175 filed November 18, 1916.

In the mining of coal, it is customary to undermine the face of a vein approximately to a depth equal to the thickness of the vein, after which the material is blasted by an explosive charge. It is very desirable that the amount of explosive used be the very least necessary to loosen the coal sufficiently to allow its removal. When the work of loading the coal is done by hand, the coal is merely shattered and the miner resorts to wedges and crow bars to win the coal from the semi-solid state in which it is left as the result of a blast, rather than resort to heavy blasting which is attendant with great hazards and is often the cause of more or less disastrous mine fires and explosions. In methods thus far tried out, for preparing the coal for loading machines, it is customary to shoot the coal entirely loose from its natural bed down onto the floor of the mine, and, besides requiring a great quantity of explosives and involving great risk of life, this method decreases the value of the coal due to the pulverizing effects of the excessive use of explosives. In some cases, mechanical picks have been used to break the coal down, but they also are undesirable in view of their bulky nature and the fact that they too produce a large amount of fine coal and dust.

It is, therefore, an object of this invention to provide a means whereby the coal may be won in lumps of the most desirable size, either from the semi-solid state in which it is left as the result of a conservative use of explosives, or, in some cases, without the use of explosives at all.

A further object of the invention is to provide an improved means whereby the car to be loaded may be moved relative to the discharge end of the loading conveyor so that such car may be uniformly loaded.

A still further object is to provide safety driving means for the conveyors, gathering device and other movable parts whereby damage to said parts and the gearing for operating the same is prevented.

A still further object of this invention is the provision of a coal loading machine including a vertically movable forward conveyor and improved means for vertically moving said conveyor.

I have found in practice that the coal production may be increased from 30 to 50 per cent if a means is provided for the storage of coal whereby the gathering thereof may continue while a loaded car is being replaced by an empty one, and it is a still further object of the present invention to provide a storage bowl or hopper to receive from a forward conveyor the coal being gathered and from which the coal is transferred to a car by a rear conveyor, the rear conveyor being capable of remaining inoperative while the forward conveyor continues operation so that the gathering operation may be permitted to continue during the period in which a loaded car is being replaced by an empty one.

A still further object of the invention is the provision of a loading machine including a forward and a rear conveyor substantially between which is situated a storage bowl or hopper, and means to horizontally swing independently or in unison the forward and rear conveyors.

A still further object of the invention is the provision of a loading machine including a wheeled truck and improved means for steering the wheels of the truck.

A still further object of the invention is to provide an improved driving means for the machine and an improved electrically operated brake therefor.

With these general objects in view and many others that will become apparent as the nature of the invention is better understood, the same consists in the novel construction, form, arrangement and combination of parts hereinafter more fully described, shown in the drawings and claimed.

In the accompanying drawings forming part of this application and in which like reference characters indicate similar parts throughout the several views, Figure 1 is a view in side elevation of the forward portion of the machine, partly broken away, and Figure 1ª is a similar view of the rear portion of the machine, together with a car in position to be loaded, the car being shown in vertical longitudinal section, partly broken away; this figure and Figure 1 together show substantially the complete machine in side elevation.

Figure 2 is a top plan view of the forward portion of the machine, the conveyor chains, one of the scraper bars, and parts mounted on the truck frame, being omitted, for sake of clearness, and Figure 2ª is a similar view of the rear portion of the machine, parts mounted on the truck frame being omitted, and the conveyor chains being shown in dotted lines for sake of clearness; this figure and Figure 2 together show substantially the complete machine in top plan view.

Figure 3 is an enlarged top plan view of the gathering-head shoe, with the gathering-arm carrying-disks removed, and parts shown in horizontal section.

Figure 4 is an enlarged transverse sectional view of the gathering-head shoe, taken approximately on line IV—IV of Fig. 2.

Figure 5 is a similar view of the shoe taken approximately on line V—V of Fig. 2.

Figure 6 is an enlarged side elevational view of the hub member of the gathering arm.

7. Figure 7 is a like view of the finger portion of the gathering arm, the point thereof being removed.

Figure 8 is a top plan view of the hub member shown in Figure 6.

Figure 9 is a top plan view of the complete finger portion of the gathering arm shown in Fig. 7.

Figure 10 is a cross sectional view of the gathering arm taken on line X—X of Fig. 9.

Figure 11 is an enlarged transverse sectional view through the forward conveyor taken approximately on line XI—XI of Fig. 1 to show the lever arrangement which is used to operate the clutches controlling the operation of the gathering-arm carrying-disks, parts of the conveyor being omitted.

Figure 12 is a similar view taken approximately on the line XII—XII of Fig. 1ª to show the shaft and hand wheels used to manually operate the car mover, parts of the machine being omitted.

Figure 13 is an enlarged detail view of a part of the rear conveyor frame and also showing partly in side elevation and partly diagrammatically the car pushing mechanism.

Figure 14 is an enlarged transverse sectional view through the rear conveyor taken approximately on line XIV—XIV of Fig. 1ª, parts of the machine being omitted.

Figure 15 is an enlarged view, partly in side elevation and partly broken away, of the intermediate portion of the machine, showing the hopper and associated parts in vertical longitudinal section.

Figure 16 is an enlarged plan view, partly broken away and partly in horizontal section, of the intermediate portion of the machine, parts being omitted for sake of clearness.

Figure 17 is an enlarged transverse vertical sectional view through the hopper, taken approximately on line XVII—XVII of Fig. 1ª, parts being omitted.

Figure 18:
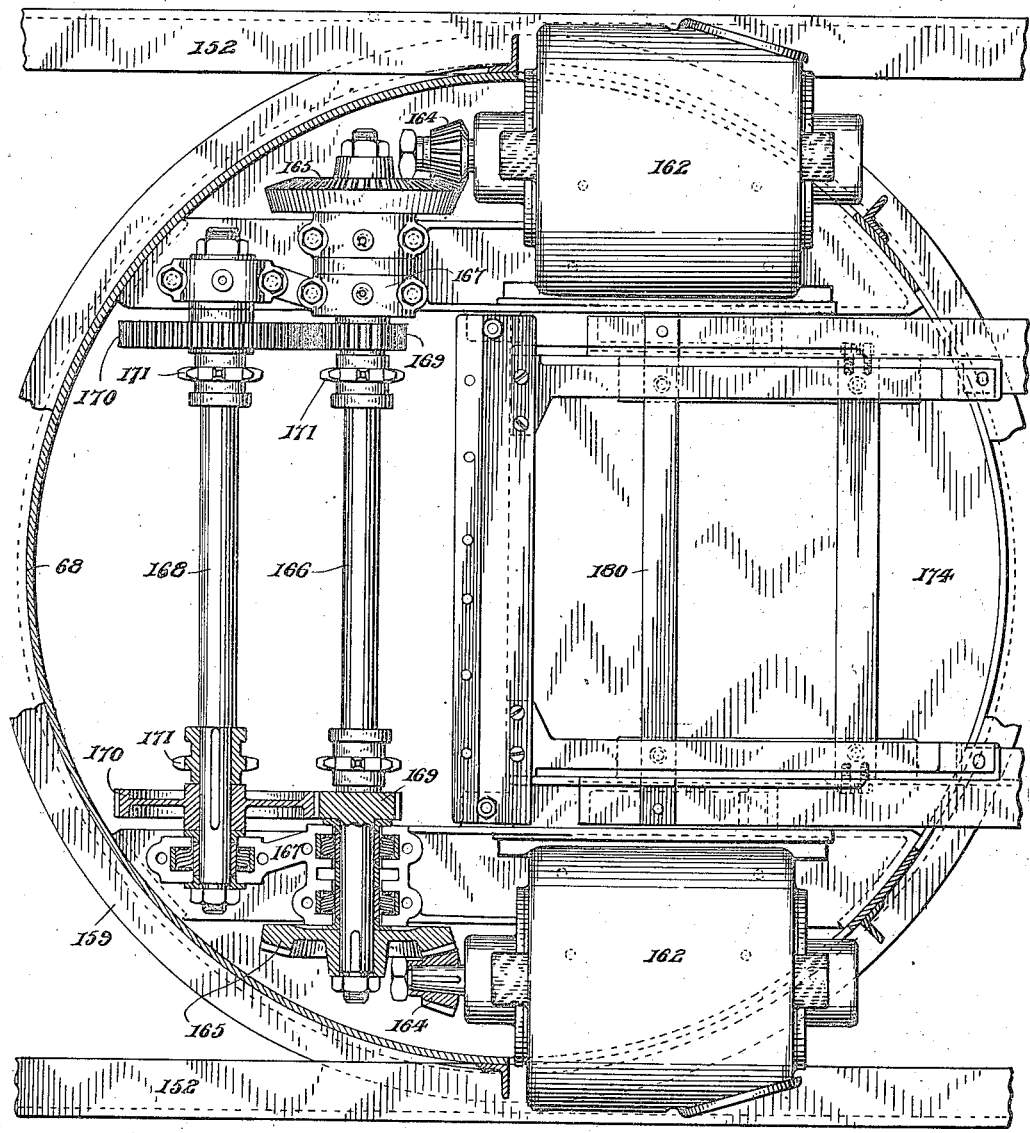

Figure 18 is an enlarged view, partly in horizontal section and partly in plan, taken through the hopper approximately on line XVIII—XVIII of Fig. 15, parts being omitted.

Figure 19:
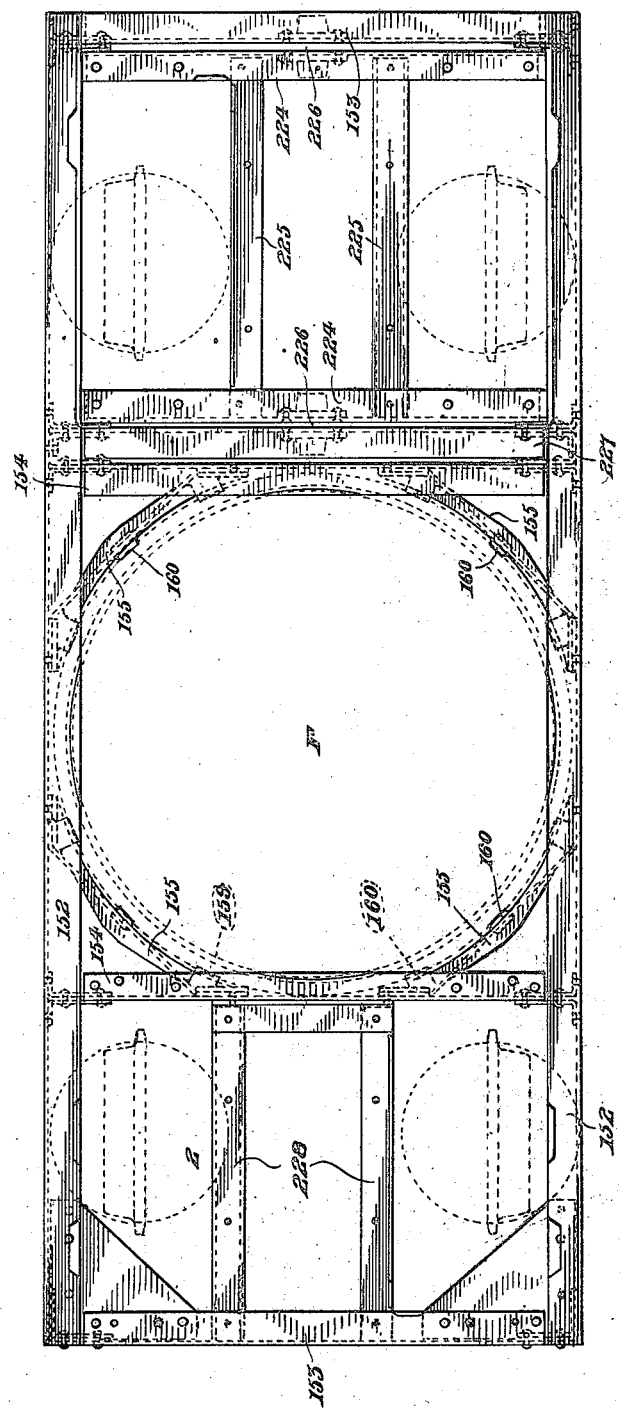

Figure 19 is a top plan view of the truck frame of the machine and showing the location of the traction wheels in dotted lines.

Figure 20:
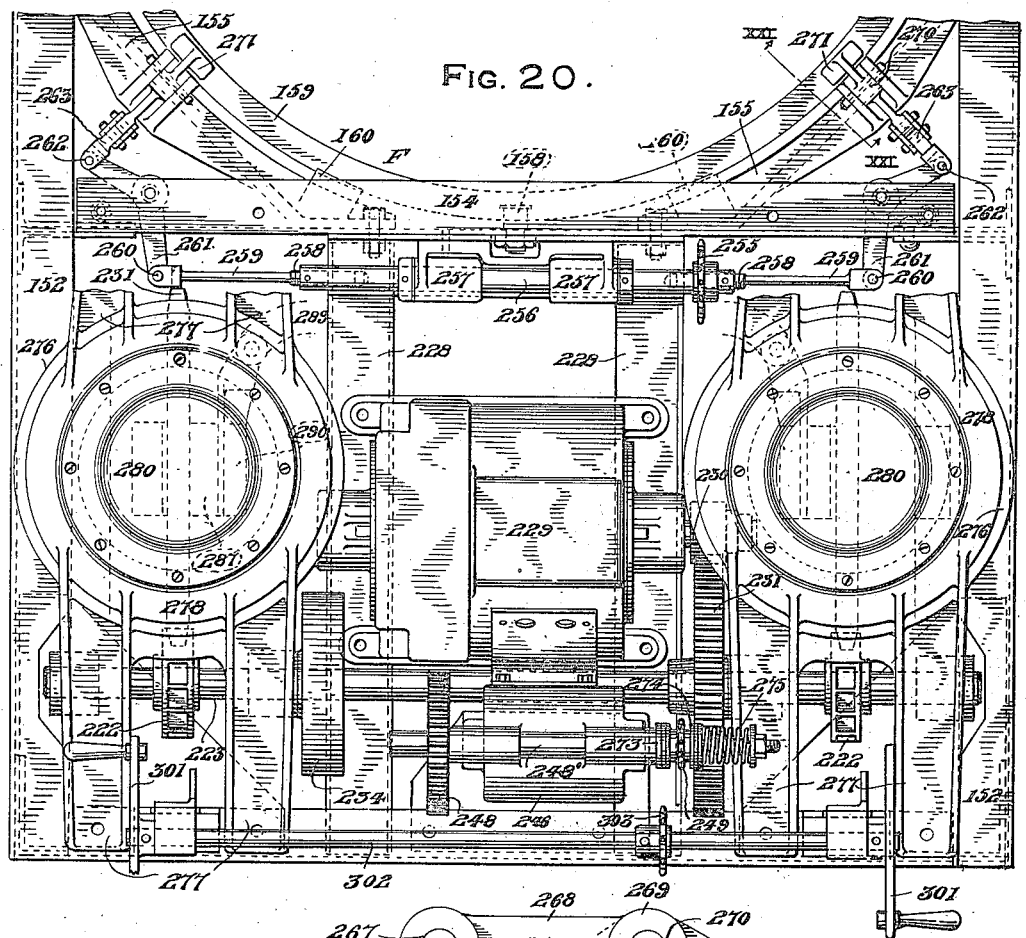
Figure 22:
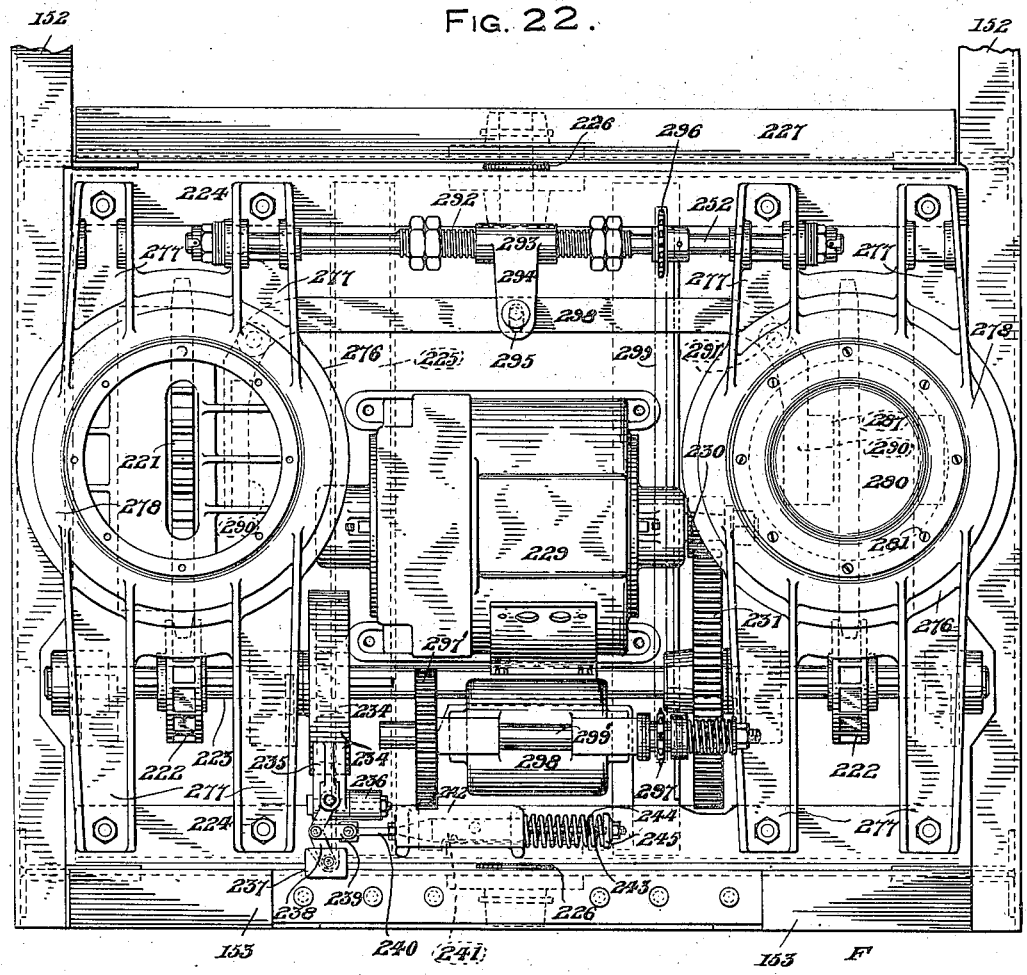

Figure 20 is an enlarged top plan view of the forward portion of the truck and parts mounted thereon, the resistance box shown in Figure 1, the steering mechanism shown in Figure 22 and the brake mechanism also shown in Figure 22 being omitted.

Figure 21:
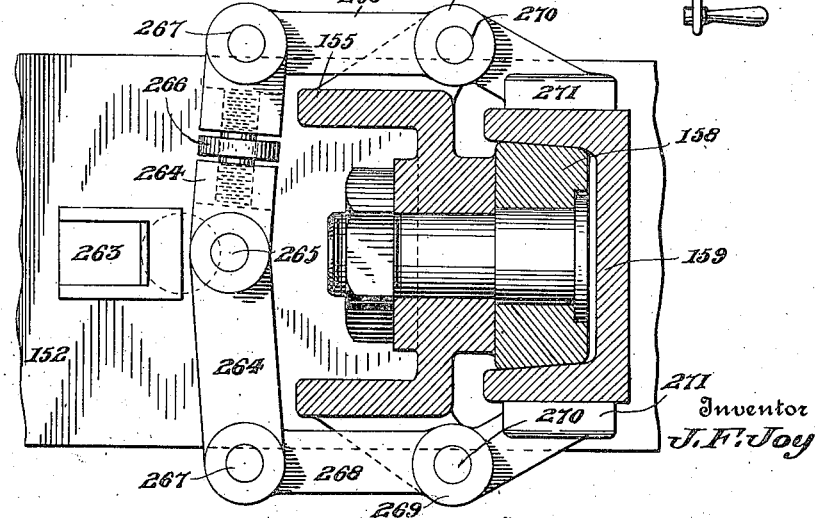

Figure 21 is an enlarged cross sectional view showing the clamping members of the hopper locking mechanism, taken approximately on line XXI—XXI of Figure 20.

Figure 22 is an enlarged top plan view of the rear portion of the truck and parts mounted thereon.

Figure 23:
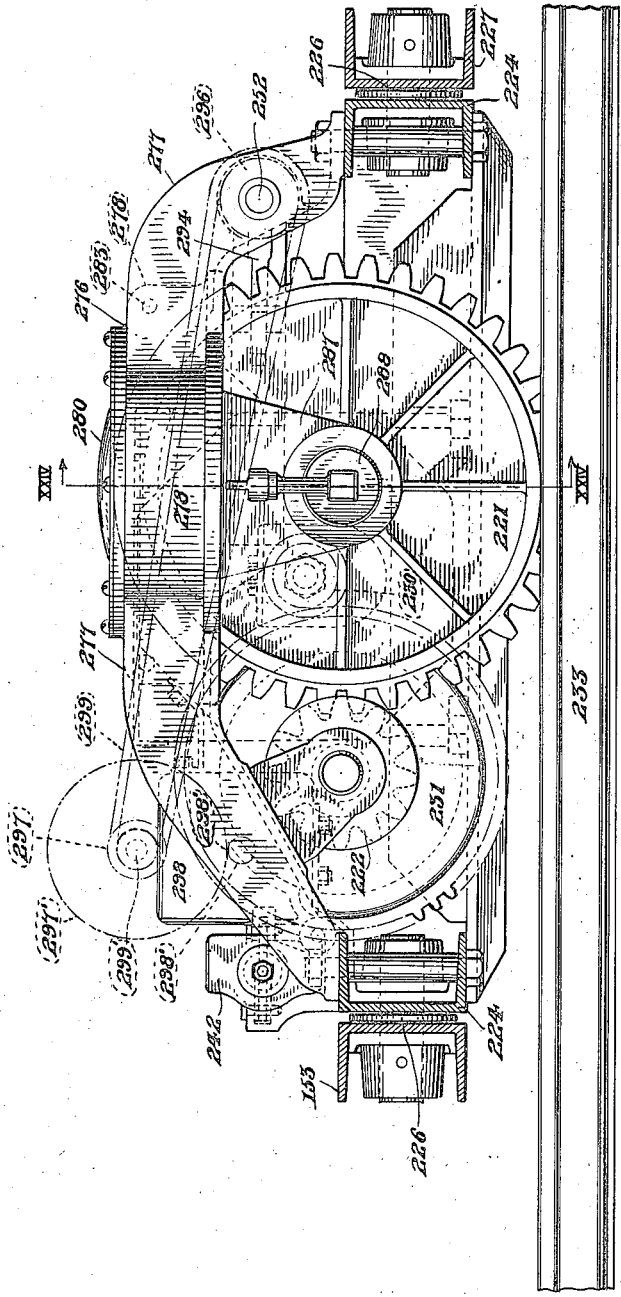

Figure 23 is an enlarged view, partly in side elevation and partly in section, of the rear portion of the truck.

Figure 24 is an enlarged transverse vertical sectional view of one of the traction wheel mountings, taken on line XXIV—XXIV of Fig. 23.

Figure 25 is a plan view diagrammatically illustrating a portion of a mine and different working positions in which the machine may operate to advantage, and Figure 26 is a perspective view of the main motor supporting frame and a portion of the forward conveyor, and showing the operating mechanisms for pawls 133, and cam 124, which are omitted from the other views for sake of clearness.

Referring more in detail to the several views, the present machine broadly includes a gathering head A carried by the lower forward end of the forward conveyor B whose upper rear end discharges into a substantially central storage bowl or hopper C from which coal is discharged by a rear or tail conveyor D extending from the bottom of the hopper C upwardly and rearwardly to a point above the car E to be loaded. The conveyors B and D extend from opposite sides of the hopper C and are supported from said hopper, the latter being mounted as hereinafter described on a single wheeled truck F.

As shown more clearly in Figures 2, 3, 4, and 5, the lower ends of the side rails or I-beams 5 of the conveyor B have suitable castings 6 secured thereto by transverse reinforcing rods or bolts 7 and the castings 6 have tubular bearings 8 at the free ends thereof in which the transverse driven foot shaft 9 of the conveyor is journaled. The gathering-head shoe is broadly composed of a base plate 10 of the form more clearly shown in Figures 4 and 5 and an upper or face plate 11 connected to the plate 10 at the forward edges thereof by transverse rivets 12, the said plates 10 and 11 being suitably maintained in spaced relation and rigidly reinforced by spacing elements 13 and 14. The ends of the plate 11 are cut away as at 15 to form in conjunction with the castings 16 substantially cylindrical or circular walls at each side of the shoe A enclosing open spaces or depressions within which certain movable parts hereinafter described are located. Adjacent the castings 6 are two-part journal boxes 17 suitably mounted and secured on the plate 10 and in which the bearing members 8 of the castings 6 are freely journaled. Rigidly secured to and mounted upon the base plate 10 centrally of the depressions enclosed by the castings 16 and edges 15 are castings 18 bolted to the reinforcing member 14 as at 19 and having upwardly extending stub shafts 20 to receive the hubs 21 of the disks 22, the latter being maintained on said stub shafts by headed retaining bolts 23 screwed into the threaded sockets 24 of the stub shafts 20. The disks 22 form substantially dust-proof closure plates for the open spaces or depressions in the shoe and are provided on their undersurfaces with beveled gear teeth 25. The ends of the conveyor foot shaft 9 extend beyond the journal boxes 17 to points adjacent the stub shafts 20 and have beveled pinions 26 journaled thereon adjacent the bearings 8, said pinions 26 being constantly in mesh with the teeth 25 on the under faces of the disks 22. The outer ends of the pinions 26 are fashioned to provide parts of clutches which are engaged by sliding clutch members 27 keyed on the shaft 9. The clutch members 27 are actuated by forks 28 whose angular ends 29 slidably rest upon the upper flat surfaces of the blocks 30 formed integral with the castings 18, and pivotally connected between the castings 16 and the forks 28 are links 31. The free ends of the shifting forks 28 are pivotally connected to bell-crank levers 32 which are in turn connected to actuating rods 33 extending rearwardly through the castings 16 and upwardly at each side of the conveyor, see Figures 1 and 2, to a point where they are pivotally attached to lugs 34 of the operating handles 35 (see Figures 1 and 11). A pair of brackets 36 are secured to the lower flanges of the I-beams 5 and journaled in these brackets 36 is a tubular transverse shaft 37 having secured on each end thereof one of the handles 35. Extending through and freely journaled within the shaft 37 is a shaft 38 which projects beyond the ends of the shaft 37 and also has a handle 35 secured on each of the opposite ends thereof. The rod 33 at one side of the conveyor B is attached to the handle 35 at that side which is secured to the shaft 38, while the rod 33 at the other side of the conveyor B is attached to that handle 35 which is secured to the tubular shaft 37 and it will be readily seen that by this arrangement either one or both of the clutch members 27 may be readily operated from either side of the machine.

Extending upwardly from the disks 22 are stub shafts 39 which extend through the apertures 40 of the hub members 41 of the gathering arms. The hub members 41 are suitably retained on the stub shafts 39, so that they may be free to swing horizontally relative to the disks 22, and have laterally projecting socketed portions 42 in which the ends of the squared guide rods 43 are secured. Swiveled on the shoe A for horizontal oscillation are suitable guide members 44 through which the guide rods 43 project, said guide members 44 being provided with vertical stub shafts, not shown, freely journaled in the apertured ears 45 of the castings 16 (see Figure 3.) The hub members 41 are provided with suitable knuckles 46 which interfit with the knuckles 47 of the gathering arm finger members 48, transverse pivot pins 49 being extended through the knuckles 46 and 47 to pivotally connect the members 41 and 48 and permit vertical movement of the latter members. Suitable stop lugs 50 are formed on the knuckles 47 to limit the upward movement of the members 48 and the lower portions of the knuckles 46 and 47 are squared as at 51 and 52 to limit the downward movement of the members 48. The finger members 48 are provided with a plurality of transverse bores or sockets 53 to frictionally receive the shanks 54 of suitable cutter teeth 55 and the members 48 are further provided with renewable or detachable points 56.

When shaft 9 is rotated, the clutch members 27 are actuated to connect pinions 26 to said shaft 9 to thereby cause rotation of disks 22 and impart movement to the gathering arms. The paths described by the tips of the gathering arm fingers are substantially reniform and extend almost entirely beyond the front edge of the shoe A, it being noted that the initial movement imparted to the finger members 48 is longitudinally to penetrate a pile of material. The finger members then move laterally and rearwardly to rake the material onto the conveyor B until they reach a point adjacent the shaft 9 when they recede or move slightly forward away from the conveyor and laterally to the sides of the conveyor to the start of the penetrating position. These paths are indicated in dotted lines in Figure 2. The fingers of the gathering arms are quite similar in form and construction to that of ordinary hand pick blades and said fingers are moved in a manner similar to that in which hand pick blades are moved by miners in the act of winning coal with hand picks. The gathering mechanism thus serves to dislodge or pick the coal loose by undermining, picking and conveying actions in addition to gathering the coal onto the conveyor.

The castings 16 have rearwardly projecting split sockets 57 in which are secured the rearwardly directed handles 58 which are utilized to manually vertically rock the shoe A about the bearings 8 of the castings 6. This construction provides means to assist in moving the shoe over irregularities of the mine floor even though said shoe is in engagement therewith.

The conveyor B is of the well known chain and scraper type employing endless chains, one of which is shown at 59 in Figure 15, which pass around the sprocket wheels 60 secured on the foot shaft 9 and the sprocket wheels 61 secured on the head shaft 62, transverse spaced scraper bars 63 having their ends suitably rigidly connected to said chains. The spaced inner flanges of the side rails or I-beams 5 form guideways for the conveyor chains and the scraper bars 63 move rearwardly above the partition 64 and forwardly or in their return movement below said partition. As shown more clearly in Figures 2 and 2ª and 15 and 16, the head shaft 62 is mounted in adjustable lubricated roller bearings 65, and secured upon one end of said shaft 62 is a sprocket wheel 66 which is geared to the main driving motor 67 as will hereinafter be made apparent.

The storage bowl or hopper C includes a lower portion 68 of tapered form, as shown in Figure 17 and having rearwardly directed spaced sides one of which is shown in Figure 1ª at 69. In plan, this member or portion 68 of the hopper has the general form of a U and superimposed upon the upper edge thereof is a channel member 70 of similar form. Mounted upon the upper edge of the member 70 is a ring member 71 having three spaced flanges providing a trackway 72 and a drum 73. It is to be noted that the height of the hopper C may be lessened by removing the member 70 and placing the member 71 directly on the upper edge of the member 68, this being sometimes necessary when the ceiling of the mine is unusually low. A substantially rectangular frame 74 is disposed horizontally slightly above the ring member 71 and has a pair of spaced transverse brackets or castings 75 rigid therewith which carry a plurality of spaced rollers 76 projecting inwardly and bearing against the flanges forming the trackway 72 of the ring member 71. The forward one of the castings 75 has a transverse pin 77 extending through a vertically elongated slot 78 in the casting 79 rigidly secured to the conveyor B and extending downwardly therefrom. The foregoing construction provides a means whereby the conveyor B may be raised and the frame 74 and parts carried thereby including the conveyor B may be horizontally rotated to thereby swing the gathering head A to either side of the working place.

The main motor 67 is rigidly mounted on the rear one of the castings 75 carried by the frame 74 and has a double sprocket wheel 80 of relatively small diameter secured on the armature shaft thereof, said sprocket wheel 80 being geared to the double sprocket wheel 81 by a double sprocket chain 82 (see Figure 15). Suitably secured against the inner faces of the side rails of the frame 74 are alined bearing members 83 which revolubly support the ends of a transverse shaft 84 freely journaled in the tubular shaft 85 upon one end of which said double sprocket wheel 81 is secured. Carried by the shaft 84 is a safety slip clutch including a casing 86 within which are a number of disks 87, alternate ones of which are respectively keyed to the tubular shaft 85 and to the casing 86. An adjusting sleeve 88 is screwed upon the end of the hub 89 of the casing 86, the latter being also surrounded by a ring 90 between which and the sleeve 88 is positioned a helical compression spring 91. Rigid with and projecting from the ring 90 into the casing 86 are rods 92 which bear against the end one of the disks 87 so as to normally maintain the latter in frictional engagement with each other through the action of the spring 91 whose strength may be varied by adjustment of the sleeve 88 to more or less tightly pack the disks 87. It will thus be seen that power is transmitted from the shaft of the motor 67 to gear 81 and sleeve 85 through the slip clutch 86 to the shaft 84, the latter having a sprocket wheel rigid therewith as at 93 which is geared to the sprocket wheel 66 through the medium of a chain diagrammatically illustrated in Figure 15 and shown by dotted lines in Figure 16 at 94. To insure the chain 94 being tight, a suitable tightening idler 95 around which chain 94 passes is provided, the same being freely journaled on a pin 96 extending laterally from the free end of an arm 97 which is pivoted as at 98 to one of the side rails of the frame 74. The arm 97 has a laterally extending apertured lug 99 in which one end of a bolt 100 is retained, said bolt extending rearwardly through a bracket 101 rigid with and extending upwardly from the adjacent side rail of the frame 74. Encircling the bolt 100 between the bracket 101 and a washer 102 is a helical compression spring 103 which normally urges the bolt 100 rearwardly to thereby raise the arm 97 and consequently cause the tightening effect above mentioned relative to the chain 94. In view of the foregoing, it will be readily seen that if either of the gathering arms, in their orbital movement, encounters a relatively immovable object such as a projection from the floor of the mine, the said arms may discontinue operation together with the conveyor shafts 9 and 62, the motor 67 being continuously driving the sprocket wheel 81 and tubular shaft 85 while the shaft 84 and gearing therefrom to the head shaft 62 remain idle. A controller switch 67' (see Figure 1) is utilized to control the operation of motor 67.

Rigidly fastened to the side rails of the frame 74 adjacent the forward end thereof and at each side of the same are brackets 104 in which a rod 105 is slidably mounted, a helical compression spring 106 being interposed between the forward bracket and washer 107 to normally rearwardly urge said rod 105. Connected to the forward end of the rod 105 is a cable 108 which extends forwardly and downwardly around an idler 109 carried by the frame 74 to a point below the conveyor B and then around another idler 110 suitably journaled in a bracket 111 rigidly carried by said conveyor B. The cable 108 then extends upwardly to the frame 74 around an idler 112 and then rearwardly under an idler pulley 113 freely revolubly mounted at the rear end of the frame 74. From the idler pulley 113, the cable 108 extends to and is secured upon a drum 114 which is secured upon a transverse shaft 115 freely journaled in bearings 116 secured against the inner faces of the side rails of frame 74 rearwardly of the main motor 67.

Securely fastened on shaft 115 is a hub member 117 forming part of a safety slip clutch whose casing 118 is freely mounted on shaft 115. Within the casing 118 are a number of friction disks 119, alternate ones of which are keyed to the casing 118 and the hub 117 respectively. Surrounding the hub 120 of casing 118 is a ring member 121 having rods 122 rigid therewith which project into the casing 118 and bear against the adjacent end one of the disks 119. Ring member 121 is normally urged away from the disks 119 by means of a helical spring 123, said ring member 121 being actuated to move in opposition to the spring 123 by means of a cam 124 (see Figures 2ª, 16, and 26) positioned between ring member 121 and a second ring member 125 which loosely surrounds the hub 120 and bears against a roller bearing 126. Rigidly bolted to the casing 118 is a sprocket wheel ring 127 which is geared to a similar sprocket wheel 128 secured upon the head shaft 62 of conveyor B by means of a sprocket chain 129 which passes around idlers 130 and 131 suitably freely journaled upon pins projecting from brackets which are rigidly fastened to the adjacent side rail of the frame 74. The drum 114 at each side of the frame 74 is provided with an inner flange having a toothed periphery as at 132, the teeth of which are engaged by a pawl 133 suitably pivotally mounted in a bracket 134 secured upon the upper face of the adjacent side rail of the frame 74.

Connecting the side rails of frame 74 at the forward ends thereof is an angle bar 305 which may be utilized to support electric lights, one of which is shown at 306 in Figure 1, to illuminate the mine in advance of the machine.

Extending rearwardly from cam 124 is an arm 307 having its rear end connected as at 308 to an endless flexible cable or chain 309 which passes around four sheaves or grooved pulleys 310, each of which is suitably rotatably supported at one of the four corners of the frame 74 as clearly shown in Figure 26. At each side of frame 74 adjacent the forward end thereof, is a hand lever 311 pivotally carried by a bracket 312 and having its upper end connected as at 313 to the cable or chain 309. By swinging either one of the levers 311 in one direction, cable or chain 309 is moved to swing arm 307 and thereby actuate cam 124 to move ring 121 and rods 122 so as to tightly pack the disks 119 and clutch the casing 118 to shaft 115. By swinging one of the levers 311 in the opposite direction, the disks 119 will be released from tight engagement with each other so that casing 118 may be rotated without imparting rotation to shaft 115. It will therefore be seen that when the disks 119 are tightly packed and the conveyor head shaft 62 is rotated by motor 67, power will be transmitted through chain 129, sprockets 127 and 128 to casing 118 and shaft 115, thus causing rotation of drums 114. This winds a cable 108 upon each drum 114 to thereby swing the conveyor B upwardly, as indicated by dotted lines in Figure 1, about the pivotal connection 77 and 78.

Pawls 133 prevent retrograde movement of shaft 115 and drums 114 so that the conveyor B will not lower until said pawls are actuated to release the same from the ratchet teeth of drums 114. Upon the rear vertical face of the angle bar 305 are rigidly secured spaced shaft hangers or brackets in which a transverse horizontal shaft 314 is journaled (see Figure 26). Shaft 314 is provided with a handle 315 on each end thereof so that the same may be rotated from either side of the machine, and secured to said shaft adjacent each end thereof is one end of one of the cables or chains 316. Each cable or chain 316 extends rearwardly from shaft 314 substantially parallel with and adjacent to one of the side rails of frame 74 to a point where its other end is connected to one of the upstanding lugs 317 rigid with pawls 133, and it will therefore be seen that, by rotating shaft 314 to wind cables or chains 316 thereon, the pawls 133 may be lifted to allow backward rotation of drums 114 and shaft 115 so that conveyor B may lower by its own weight.

It is noted that even though the clutch casing 118 be continuously operated, the same will slip relative to shaft 115 after conveyor B is raised to its highest position, thus preventing breakage of gearing and other parts which might otherwise take place through the operator not operating cam 124 in time. It is also noted that the elongated slot 78 in which the pin 77 may move vertically is provided so that the support for the conveyor B when raised will be a resilient one, said conveyor B being allowed to yield vertically slightly by this means and the spring 106 in the hoisting mechanism for said conveyor B.

The rollers 76 carried by the castings 75 of the frame 74, being freely movable in the ring member 71, allow the frame 74 and conveyor B to horizontally swing so as to direct the gathering head A to either side of the working place and in order to swing the frame 74 and conveyor B, a cable 135 is extended around the ring member 71 in the drum 73 thereof from a drum 136 at one side of the conveyor to a similar drum 137 at the opposite side of the conveyor. The drums 136 and 137 have worm gears 138 rigid with the hub members thereof which are in constant mesh with worms 139 suitably secured upon the ends of a transverse shaft 140 supported by suitable brackets underneath the conveyor B as clearly shown in Figures 1, 2, 15 and 16. A pair of spaced sprocket wheels 141 are also secured upon shaft 140 in a position to be engaged by the chains 60 of the conveyor B so as to cause rotation of said shaft 140 and through the medium of the gears 138 and 139 to cause rotation of drums 136 and 137. Drums 136 and 137 form casings of safety slip clutches within each of which are positioned a plurality of disks 142 (see Figure 15), alternate ones of which are keyed to the hub member 143 secured to the gear 138 and to the casing formed by the drums 136 or 137 respectively. Screwed on the hub 143 of each of the drums 136 and 137 is a sprocket sleeve 144 which is actuated to move a ring 145 toward the disks 142 so that the rods 146 which are rigid with said ring 145 and project into the drums 136 and 137, may closely pack the disks 142 to communicate rotation from gears 138 to drums 136 and 137. The sprocket sleeves 144 are geared to sprockets 147, only one of which is shown, (see Figure 1) by a chain 148 indicated by dotted lines in Figure 1, said sprocket wheel 147 being secured upon a vertical stub shaft 149 suitably journaled in and supported by a bracket 150 which also carries the controller switch 67' and assists in supporting one of the drums 136 and 137. By turning hand wheel 151 at either side of the machine in one direction, the disks 142 are packed tightly to communicate rotation from shaft 140 through gearing 138 and 139 to drum 136, thus causing cable 135 to wind up on said drum 136 and to unwind from the other drum 137, thereby causing the conveyor B to swing in one direction. If this operation is performed at either side of the machine to rotate the drums in the opposite direction conveyor B will be caused to swing horizontally in the opposite direction by winding cable 135 upon the drum 137 and simultaneously unwinding the same from drum 136.

The truck frame F, which is clearly shown in Figure 19, is of rectangular form and includes a pair of side rails 152 connected by end rails 153 and intermediate transverse bars 154 which are rigidly fastened to the side rails 152 in spaced relation. Arranged at the corners of the rectangular space enclosed by the bars 154 and intermediate portions of the side rails 152, are diagonal braces 155 which have their ends each respectively secured to one of the transverse bars 154 and to one of the side rails 152. Secured to and projecting from the side rails 152 intermediate the diagonal braces 155 are opposed pivot pins 156 (see Figure 17) which project inwardly and have friction rollers 157 freely journaled thereon. Similarly, the cross bars 154 each have rollers 158 (see Figure 15) supported therefrom in the same manner and the rollers 157 and 158 project into the space between the flanges of a channel ring member 159 which is rigidly carried in a substantially horizontal position by the lower end of the hopper portion 68. The ring 159 is therefore suitably supported for horizontal rotation upon the rollers 157 and 158 so that the tail or rear conveyor D rigidly carried by the hopper C may be swung horizontally as will hereinafter be made apparent. The diagonal braces 155 are provided with a number of sockets 160 to form mountings for pivot pins similar to the pivot pins 156 to provide additional mountings for additional rollers, similar to the rollers 157 and 158, which also are received between the flanges of ring 159.

The sides 69 of the hopper portion 68 are cut away as at 161 to provide openings through which the driving motors 162 for the rear or tail conveyor project. Motors 162 are supported on a suitable framework at the lower portion of the hopper, which framework includes castings 163 (see Figure 17) which are rigidly fastened to the ring member 159. The arrangement of the motors 162 at each side of the hopper provides a balanced construction and a dual drive for the foot shaft of the rear conveyor, which has its advantages. Fastened upon the armature shafts of the motors 162 are suitable beveled pinions 164 which are in constant mesh with beveled gears 165 fastened upon the ends of the rear conveyor drive shaft 166 (see Figures 15 and 18). Shaft 166 is supported and journaled in roller-bearing journal boxes 167 and is geared to the foot shaft 168 of the rear conveyor by spur gears 169 and 170, respectively secured on the shafts 166 and 168, said shaft 168 being also journaled in the roller-bearing journal boxes 167. Shafts 166 and 168 each have a pair of spaced sprocket wheels 171 secured thereon and around which the chains of the rear conveyor pass as more clearly shown in Figure 15, one of the conveyor chains being diagrammatically shown in this figure at 172 and both of which are shown by dotted lines at 172 in Figure 2$^a$. This rear or tail conveyor hereinbefore designated D as an entirety is also of the well known chain and scraper type including side rails 173 of I-beam formation and between the inner flanges of which is arranged a suitably supported partition 174 (see Figure 15). The chains 172 of the rear conveyor are connected by transversely arranged spaced scraper bars 175 and pass around sprocket wheels 176 (see Figure 2$^a$) mounted upon the head shaft of the rear conveyor, said head shaft being indicated by dotted lines at 177 in said Figure 2$^a$.

The lower ends of the side rails 173 are suitably rigidly fastened to the lower portion of the hopper adjacent the ring 159 and it will therefore be readily apparent that any rotation of the hopper C will cause horizontal swinging movement of the rear conveyor D.

A controller 162' is suitably supported beneath the conveyor D rearwardly of the motors 162 and said controller is suitably connected to the motors 162 so that by operating the same, the motors 162 may be thrown into and out of operation to render the rear conveyor operative or inoperative at will. As shown in Figure 17, a pair of inclined plates 178 are provided having their upper ends connected to the hopper member 68 and their lower ends connected to angle bars 179 which are suitably supported on transverse reinforcing members or braces 180. It will thus be seen that the plates 178 are in effect false sides for the hopper which shield the motors 162 from the coal which is loaded into the hopper. The plates 178 also form an inclined bottom 181 for the hopper as shown in Figure 16 which gradually inclines downwardly above the shafts 166 and 168 to shield the latter as well as the gearing between the same and the motors 162.

The rear or tail conveyor D is made in two sections as shown clearly in Figure 1$^a$, the lower section which is rigid with the hopper C, having a casting 182 secured to each of the side rails 173 thereof which is pivotally connected at 183 to a similar casting 184 secured to each of the side rails of the upper rear section of said conveyor D. It will thus be seen that the section generally designated by $d$ may be raised or lowered by being swung upon the pivot 183. In order to effect this adjustment, there are provided suitable internally screw threaded sockets 185 supported for universal movement by the lower ends of the castings 182 and 184 and into which are screwed the ends of stub shafts 186 which carry a worm gear 187. The worm gear 187 is in constant mesh with a worm 188 secured upon a suitably supported transverse shaft which has a hand wheel 189 also secured thereon. By rotating the hand wheel 189, the stub shafts 186 are rotated through the gears 187 and 188 to screw into or out of the sockets 185 and thereby draw the lower ends of the castings 182 and 184 toward each other or move the same away from each other according to the direction of rotation of said shafts 186 to thereby raise or lower the rear section $d$ of the conveyor D. This adjustment is desirable when the roof of the mine is unusually low in order to prevent the section $d$ from striking said roof.

Suitably supported beneath the adjustable section $d$ of the rear conveyor is an electric motor 190 (see Figures 1$^a$, 2$^a$, 13 and 14). The motor 190 is provided with tubular brackets 191 through which a transverse shaft 192 is freely journaled, said shaft 192 and the motor 190 being rigidly supported by brackets 193 depending from and secured to the outer bottom flanges of the side rails 173 of the rear conveyor. The armature shaft of motor 190 has a small spur pinion 194 secured thereon and in constant mesh with a spur gear 195 secured upon the adjacent end of shaft 192. The opposite end of shaft 192 has a small sprocket wheel 196 freely journaled thereon between a series of friction disks 197 and 198, one of which friction disks, as clearly shown in Figure 14, is integral with a sleeve 199 keyed to shaft 192 and which is normally urged into frictional engagement with the adjacent disk by means of a helical spring 200 arranged between a collar 201 secured on shaft 192 and a ring 202 also carried by said shaft 192. It will be readily seen that this construction provides a means whereby the sprocket 196 may be rotated with shaft 192 when the the rotation of said sprocket wheel 196 is not resisted by a force sufficient to overcome the degree of friction maintained between the disks 197 and 198 and sprocket wheel 196 by the spring 200 and, on the other hand if rotation of the sprocket wheel 196 is sufficiently resisted to overcome the friction between disks 197 and 198 and sprocket wheel 196, said sprocket wheel 196 may remain stationary while the shaft 192 continues rotation. Obviously, this construction affords a safety driving means for this part of the machine which is, specifically, a car moving device as will presently become apparent. A relatively large sprocket wheel 203 is journaled on a pin 204 supported by a bracket 205 which is riveted as at 206 to the outer upper flange of one of the side rails 173 of the rear conveyor and said sprocket wheel 203 is operatively connected to the sprocket wheel 196 by a chain 207. At the other end of the conveyor section d is a suitably supported idler sprocket wheel 208 and around this sprocket and the sprocket 209, carried by the sprocket wheel 203, is passed a chain 210 which is diagrammatically illustrated in Figure 13 and by dotted lines in Figure 1ª. It is here noted that the sprocket wheel 203 and chain 207 as well as the disks 198 are shown in dotted lines in Figure 1ª for sake of clearness although they would actually appear in full lines in this figure. Sprocket chain 210 has tubular sockets 211 at its ends which are internally screw threaded and slidably received within the mounting sockets 212 of a car pusher fork 213. An adjusting nut 214 is positioned between the mounting sockets 212 and has oppositely extending stems which are screw threaded into the tubular sockets 211 as clearly shown in Figure 13. It is obvious that by turning the nut 214, the ends of the chain 210 may be drawn together to tighten the latter and to detain the ends of said chain 210 connected with the fork 213 mounted thereon.

From the foregoing description, it will be readily apparent that when the controller 215 for the motor 190 is actuated to start the operation of said motor, rotation will be imparted to shaft 192 through the gearing described to sprocket 209, thereby causing movement of the endless chain 210 so as to rearwardly move the car pushing fork 213 which is at that time straddling the rear board 216 of the car E to be loaded. This causes a gradual and uniform movement of the car E rearwardly relative to the discharge end of the conveyor D and therefore insures uniform loading of said car.

It is at times found desirable to rearwardly move the car E by manual power and in order to accomplish this result, a transverse shaft 217 (see Figure 12) is freely journaled through the webs of the I-beam side rails 173 of the rear conveyor D, the ends of said shaft 217 being extended a slight distance beyond the outer sides of said side rails 173. Secured upon the oposite ends of shaft 217 are hand wheels 218 and upon one end of shaft 217 adjacent one of the wheels 218 is a small sprocket wheel 219. As indicated by dotted lines in Figure 1ª, a sprocket chain 220 may be passed around sprocket wheel 203 and around sprocket wheel 219 to operatively connect shaft 217 with the small sprocket 209. By this arrangement, an operator at either side of the machine is enabled to rotate one of the hand wheels 218 to cause movement of the chain 210 and fork 213 whereby the car E may be manually rearwardly moved.

Each of the four traction wheels 221 provided for the truck F has the flange thereof formed with teeth so as to constitute substantially a spur gear as clearly shown in each of Figures 1, 1ª, 20, 22 and 23, and meshing with the teeth of these traction wheels at each end of the truck frame are shrouded pinions 222 which are splined on transverse shafts 223 to freely slide longitudinally upon the latter. This construction with respect to the forward portion of the truck frame is clearly illustrated in plan view in Figure 20 and with respect to the rear portion of the truck in similar view by Figure 22. The rear portion of the truck frame has a supplemental frame, constitued by transverse bars 224 and longitudinal bars 225, which is pivotally mounted at 226 upon the adjacent end rail 153 and a transverse bar 227 so as to tilt laterally for purposes which will presently become apparent. Supported upon the longitudinal bars 225 of the rear portion of the truck frame and also upon similar bars 228 of the front portion of the truck frame are motors 229 having pinions 230 secured upon the armature shafts thereof and meshing with large spur gears 231 secured upon the shafts 223. A suitable controller switch 232 is supported under the forward conveyor B (see Figure 1) and this controller is connected in any well known manner to the motors 229 so as to throw the same into and out of operation. It will be readily seen that when motors 229 are thrown into operation, power will be transmitted through gearing 230, 231, 222, and 221 to cause forward movement of the machine upon the rails 233 so as to advance the gathering head A to a point adjacent the face of the coal vein.

Secured upon the shafts 223 as clearly shown in Figures 20 and 22, are wheels 234 adapted to be engaged by brake shoes 235, one of which is shown in Figure 22 and the other of which has been removed from Figure 20 for sake of clearness in the latter figure. Each brake shoe 235 is pivotally mounted as at 236 and is connected with an adjacent rigid lug 237 by means of toggle levers 238 which are in turn connected to a link 239 attached to the outer end of a rod 240 extending into and connected to the movable core indicated by dotted lines at 241 in Figure 22 of a solenoid 242. A rod 243 is attached to the movable core 241 and extends from one end of the solenoid 242, a helical spring 244 being arranged surrounding the rod 243 between a washer 245 and the casing of the solenoid 242 to normally maintain the rod 240 retracted within the casing of the solenoid 242 so as to straighten the toggle levers 238 and thereby cause brake shoe 235 to frictionally engage the adjacent wheel 234 and hold the machine against movement upon the tracks 233. In practice, solenoids 242 have been placed in the circuit containing motors 229 so that when said motors are thrown into operation to drive the machine ahead or backwardly, the solenoid 242 will be energized to move the core thereof to the position shown in Figure 22 against the action of the spring 244 so as to break the toggle levers 238 and release shoe 235 from the adjacent wheel 234. On the other hand, this arrangement, when the motors 229 are thrown out of operation, will cause the solenoid 242 to be de-energized and through the action of spring 244, the toggle levers 238 will be straightened so as to maintain the brake shoe 235 against the adjacent wheel 234, thereby preventing rotation of shafts 223 and consequently the traction wheels 221 which are geared to said shaft.

Suitably mounted upon the forward portion of the truck frame F is a small motor 246 (see Figures 1 and 20) whose armature shaft has a pinion 247 secured thereon in mesh with a spur gear 248 carried by a shaft 248' suitably supported above the motor 246 as indicated in Figures 1 and 20. This shaft last referred to is provided with a sprocket wheel 249 around which passes a chain indicated at 250 by dotted lines in Figure 1, said chain also passing around an idler sprocket 251 freely journaled on a shaft 252 which has been omitted from Figure 20 and which is similar to the shaft 252 of Figure 22 forming part of a steering mechanism which will later be described. Shaft 252 of the front portion of the truck shown in Figure 1 has another sprocket 253 freely journaled thereon and connected to the sprocket wheel 251, around which passes a chain 254 which extends downwardly and also passes around a slightly larger sprocket wheel 255 shown by dotted lines in Figure 1 and by full lines in Figure 20. Sprocket 255 is secured upon a shaft 256 journaled in suitable bearings 257, said shaft 256 being provided with internally threaded bores at the ends thereof into which are screwed the ends 258 of rods 259. Rods 259 have their outer ends pivoted as at 260 to bell crank levers 261 which are pivoted to the transverse bar 154 of the truck frame F as clearly shown in Figure 20. The bell crank levers 261 have their other ends pivotally connected as at 262 to rods 263 which are in turn pivotally connected to toggle levers 264 adjacent the pivotal connection 265 of said toggle levers as shown in Figure 21. It will be noted in this figure that the upper one of the levers 264 is made adjustable by means of the connection 266 which involves a nut having stub shafts screwed into sockets in the adjacent ends of the two sections of said toggle lever. The toggle levers 264 have their ends pivotally connected as at 267 to the shanks 268 of clamping members 269 which are pivotally mounted as at 270 upon the diagonal braces 155 and are provided with clamping jaws 271 arranged to flatly engage the upper and lower faces respectively of the upper and lower flanges of the channel ring 159 rigidly carried by the bottom portion of the hopper C. In order to throw the motor 246 into and out of operation suitable connection is made between the latter and a switch 272 carried by the adjustable section d of the rear conveyor D as clearly shown in Figure 1ª, although said switch 272 may be located at any other point on the machine that may be found desirable. By this construction, it will be seen that by actuating switch 272, motor 246 will be thrown into operation so as to transmit power through pinion 247 to gear 248 and through sprocket wheel 249, chain 250, sprocket wheel 251, sprocket wheel 253, sprocket chain 254, and sprocket wheel 255, to shaft 256 so as to rotate the latter and thereby cause the ends 258 of the rods 259 to move outwardly. Upon outward movement of the rods 259 bell crank levers 261 are swung on their pivots so as to move rods 263 whereby the toggle levers 264 are straightened and the clamping members 269 swung on their pivots 270 to cause the jaws 271 to tightly engage the flanges of ring 159 and thereby lock the hopper C against rotary movement, By reversal of this operation, the jaws 271 will be caused to release the flanges of the ring 159 and thereby render the hopper C free to rotate. It is noted that when the hopper C is not locked against rotary movement and the shoe A is lowered into engagement with the ground or floor of the mine so as to prevent ready horizontal swinging movement of the conveyor B, the operation of drums 136 or 137 instead of swinging the conveyor B will cause the rear or tail conveyor D to horizontally swing. On the other hand, when hopper C is locked against rotation and shoe A is raised up off of the mine floor, the operation of drums 136 and 137 will effect a horizontal swinging of shoe A and conveyor B but will not effect the rear conveyor D. As clearly shown in Figure 25, this flexibility of the machine has decided advantages by reason of the fact that the head A, conveyor B and conveyor D may be moved to any desired angle relative to the frame F and relative to each other. In the position of the machine indicated at the right hand side of Figure 25, the shoe A and conveyor B are arranged in position to load coal from a room neck G into the hopper C and from which the coal may be loaded at right angles to conveyor B by means of conveyor D into the car E.

Figure 25 still further illustrates the desirability of the machine being flexible wherein the same is shown passing around a room neck at H with both the forward conveyor B and the rear conveyor D at a slight angle to each other and the truck frame F so as to avoid, with ease, striking against the side walls of the mine. A still further advantage gained by the flexibility of the machine is illustrated in the upper portion of Figure 25 at the left hand side thereof wherein the machine is shown in full lines as performing the function commonly known in the art as "gobbing slate in a mine room". In this use of the machine, the shoe A may be directed to any portion of the face of the vein and especially to the corners of the mine room as shown so as to remove slate which is in the way at the face of the vein and to unload the same in a remote corner as at K. This portion of Figure 25 further illustrates in dotted lines the position of the conveyors and gathering head which the same will assume in loading coal into a car upon the tracks 233 from a point to one side of the mine room.

Sprocket wheel 249 is mounted upon the shaft 248' between friction disks 273 and 274 which are maintained in frictional engagement with each other by means of a helical spring 275 similar to the manner in which sprocket wheel 196 of the car pusher is mounted upon shaft 192 between the disks 197 and 198 which are maintained in frictional engagement with each other by the spring 200. By this means, sprocket wheel 249 may slip relative to the shaft 248' if the motor 246 is not promptly stopped when the clamping jaws 271 have been moved into engagement with the flanges of the ring 159, thereby preventing breakage of parts such as the gearing between the shaft of motor 246 and shaft 256.

Mounted upon the front portion of the truck F at each side thereof are castings 276 provided with oppositely extending spaced pairs of legs 277 whose ends rest upon the frame bars 153 and 154 at which point said legs are rigidly fastened by means of bolts or the like. Similar castings also designated 276 in Figure 22 are mounted upon the rear portion of the truck F and have their oppositely extending spaced pairs of legs 277 similarly secured to the supplemental or tiling frame bars 224. The legs 277 of castings 276 extend from the main or circular inverted bowl shaped portions 278 of said castings, one of which bowl shaped portions is clearly shown in cross section in Figure 24. As the construction of each of these castings 276 are similar in all respects, further description of the same will be confined to a single one of the same. Construing the portion 278 as an inverted bowl, the bottom of the same is centrally apertured as at 279 and such aperture is closed by a swelled disk 280 suitably secured in place by means such as screws 281. The under face of the bowl 278 is formed to provide a race-way at 282 for ball bearings 283 which are suitably supported and retained horizontally and in circular form upon the upper face 284 of the disk portion 285 forming a part of the casting 286. Casting 286 is formed with a pair of depending legs 287 extending from the disk portion 285 and between which the traction wheel 221 is positioned. A suitably lubricated transverse pin 288 extends through the lower ends of the legs 287 and forms a suitable axle upon which the traction wheel may freely rotate. By reason of this construction, it will be readily seen that each of the traction wheels 221 is carried by a substantially turn-table mounting so that each pair of the same may be readily caused by means to be later described to follow the tracks upon which the machine is moved even though defective switches are encountered when turning abrupt corners such as that indicated at H in Figure 25 when moving from the main entry J of the mine into a room I.

The pairs of traction wheels 221 at each end of the truck frame F are interconnected by a connecting rod 289, the one associated with the rear portion of the truck frame being shown in full lines in Figure 22 and partially shown in dotted lines in Figure 20 relative to the forward truck. The connecting rods 289 each have their opposite ends pivotally connected to one of the castings 290 indicated by dotted lines in Figures 20 and 22 and secured against the inner face of the inner leg 287 of the adjacent casting 286 forming part of the traction wheel mounting. The pivotal connection between the ends of connecting rods 289 and the castings 290 are indicated by dotted lines at 291 in each of Figures 20 and 22.

The transverse shaft 252 hereinbefore mentioned, is journaled in suitable bearings formed in the short legs of the castings 276 as clearly shown relative to the rear end of the truck frame in Figure 22, the same being omitted from Figure 20 relative to the forward portion of the truck frame F in order to clearly illustrate the locking mechanism in the latter figure. Shaft 252 has a threaded intermediate portion 292 upon which is screwed a collar 293 having a lateral projection or lug 294 loosely connected as at 295 substantially to the central portion of the connecting rod 289. Secured on shaft 252 is a sprocket wheel 296 which is geared to sprocket wheel 297 by means of a sprocket chain 299 indicated by dotted lines in Figures 1ª, 22, and 23. Sprocket wheel 297 is carried by shaft 299' which is journaled in bearings above motor 298 and has a large spur gear 297' secured on one end thereof in mesh with a spur pinion 298' secured on the armature shaft of motor 298. A suitable switch 300 is carried by the conveyor B (see Figure 1) and is electrically connected in any well known manner to the motor 298 in order to throw the same into and out of operation, and it will be readily apparent that when said motor 298 is thrown into operation, power will be transmitted through the gearing 298', 297', 297, 299 and 296 to shaft 252, thereby causing movement of collar 293 longitudinally upon the threaded portion 292 of said shaft 252 and consequently longitudinally moving the connecting rod 289 to steer the rear pair of traction wheels. Sprocket wheel 297 is mounted so as to afford a safety driving connection in this part of the machine, similar to that afforded by the mounting of sprocket wheel 249, as clearly shown in Figure 22.

The steering of the front wheels of the truck F is accomplished in practically the same manner just described, with the exception that the shaft 252 at the forward portion of the truck is manually actuated by means of hand wheels 301, one of which is provided secured upon each end of a transverse shaft 302 suitably supported adjacent the motor 246. By providing a hand wheel 301 adjacent each side of the frame F, an operator may steer the front truck wheels from either side of the machine. A sprocket chain 303' passes around the sprocket wheel 303 carried by shaft 302 and thence rearwardly around a sprocket, similar to the sprocket 296 in Figure 22, which is secured upon the shaft 252 at the forward portion of the truck frame.

If found desirable, a suitable resistance 304 (see Figure 1) may be mounted upon the castings 276 at the forward end of the truck F and into which an electric cable may pass, from which cable the current is derived to actuate the several motors hereinbefore described as operating the several movable parts of the present machine.

When the machine has been brought into the room where the coal is to be broken down and loaded, the gathering mechanism including head A together with the conveyor B are lowered into contact with the floor and the machine is advanced along the rails 233 until said head A is in close proximity to the face of the vein. The truck F is prevented from retrograde movement by brake shoes 235, and an empty pit car E is moved into place at the rear of the machine to receive coal from the conveyor D. The motor 67 is then started to drive the chains of conveyor B and the clutch members 27 are placed in engagement with the beveled pinions 26 to actuate the gathering arms. Motors 229 are then started to move the machine forward, and one of the handles 58 is manipulated to assist the shoe A to penetrate under the coal and over the uneven floor. As the gathering arms, in their orbital movements, encounter the coal, said arms will move the coal onto the conveyor B to be carried to hopper C and subsequently into pit car E from said hopper by conveyor D. At times the gathering arms are caused to move forwardly to longitudinally penetrate the shattered coal that is standing in a semi-solid state and then laterally to engage behind the coal, and when the arms are so engaged, the machine is backed away from the face of the vein, thus causing said arms to tear down onto the floor an unusually large quantity of coal. When the machine has been advanced as far as is desirable, the same is backed far enough to withdraw the shoe A from the undercut and to clear the coal at the sides of the same, after which handle 151 is actuated in a direction to cause the shoe A and conveyor B to swing to one side to be again advanced along a new path to gather and break down the coal. This operation may be repeated until the coal has been gathered across the entire width of the working place.

While the form of the invention herein shown and described, is what is believed to be the preferred embodiment thereof, minor changes may be made therein without departing from the spirit and scope of the invention as claimed.

What I claim as new is:—

1. A loading machine including a wheeled truck, a hopper mounted on said truck for horizontal rotation, a conveyor to move material from a point adjacent the ground into said hopper and mounted on said hopper to swing horizontally, a second conveyor rigid with said hopper to discharge material from the latter into a pit car, and means to horizontally swing the first named conveyor constructed to rotate said hopper and horizontally swing the second named conveyor when the first named conveyor is restrained from swinging.

2. A loading machine including a wheeled truck, a hopper mounted on said truck adjustable in height, a conveyor mounted on said hopper adapted to move material from a point adjacent the ground into said hopper, and a second conveyor carried by said hopper to discharge material from the latter into a pit car.

3. A loading machine including a wheeled truck, a hopper mounted on said truck adjustable in height, a conveyor mounted on said hopper adapted to move material from a point adjacent the ground into said hopper, and a second conveyor carried by said hopper to discharge material from the latter into a pit car, said second conveyor including an upper rear vertically adjustable section.

4. A loading mechanism including a wheeled truck, a hopper mounted for horizontal rotation on said truck, a forward conveyor to move material into said hopper carried by the latter, a rear conveyor rigidly carried by said hopper to discharge material from said hopper into a car, and releasable clamping means to hold the hopper from rotation.

5. A loading machine including a wheeled truck provided with rollers, a hopper having a circular horizontal track rigid with the bottom portion thereof and within which said rollers project to support the hopper for horizontal rotation, a conveyor rigid with said hopper to discharge the contents of the latter, a circular horizontal track rigidly connected to the upper portion of said hopper, a frame provided with rollers which project into the second named track to support said frame for horizontal rotation, and an inclined conveyor carried by said frame to deliver material from a point adjacent the ground into said hopper.

6. A loading machine including a wheeled truck provided with rollers, a hopper having a circular horizontal track rigid with the bottom portion thereof and within which said rollers project to support the hopper for horizontal rotation, a conveyor rigid with said hopper to discharge the contents of the latter, a circular horizontal track rigidly connected to the upper portion of said hopper, a frame provided with rollers which project into the second named track to support said frame for horizontal rotation, an inclined conveyor carried by said frame to deliver material from a point adjacent the ground into said hopper, and means to selectively rotate said hopper or said frame.

7. In a loading machine, an inclined conveyor, a horizontally rotatable storage bowl into which said conveyor may discharge material, a conveyor rigid with said storage bowl to discharge the contents of the latter, clamping means to retain said bowl from rotation, and a safety power operated actuating mechanism for said clamping means.

8. A gathering mechanism including a horizontally swingable hub member, a horizontal finger member hinged to said hub member for vertical movement, means to limit the upward movement of said finger member, and means operatively connected to said hub member to move the finger member in a substantially horizontal reniform orbital path.

9. A gathering mechanism including a horizontally swingable hub member, a horizontal finger member hinged to said hub member for vertical movement, means to limit the upward movement of said finger member, means to prevent said finger member from moving below a point wherein the same is horizontally alined with said hub member, and means operatively connected to said hub member to move the finger member in a substantially reniform horizontal orbital path.

10. A gathering mechanism including a substantially horizontally arranged gathering arm, and means to move said arm horizontally in a substantially reniform orbital path, said gathering arm including a finger member hinged for vertical movement and having cutter bits extending upwardly from and rigidly carried by the same.

11. In a gathering mechanism, a gathering arm including a substantially horizontal hub member having spaced knuckles, a substantially horizontal vertically swingable finger member having spaced knuckles interfitting with and pivoted to the knuckles of the hub member, and means operatively connected to the hub member to move the finger member substantially horizontally in a substantially reniform orbital path.

12. In a gathering mechanism, a gathering arm including a substantially horizontal hub member having spaced knuckles, a substantially horizontal vertically swingable finger having spaced knuckles interfitting with and pivoted to the knuckles of the hub member, means including a stop lug carried by one of said knuckles to limit movement of the finger member in one direction of its vertical swinging movement, and means operatively connected to said hub member to move the finger member in a substantially reniform horizontal orbital path.

13. In a gathering mechanism, a gathering arm including a substantially horizontal hub member having spaced knuckles, a substantially horizontal vertically swingable finger member having spaced knuckles interfitting with and pivoted to the knuckles of the hub member, said knuckles being cooperatively constructed to limit the vertical swinging movement of the finger member in opposite directions, and means operatively connected to said hub member to move the finger member in a substantially reniform orbital path.

14. A loading machine including a wheeled support, a storage hopper mounted thereon to rotate about a vertical axis, an inclined conveyor to move material from a point adjacent the ground into said hopper, means to operate said conveyor, a second inclined conveyor rigid with the hopper and arranged to discharge material from the bottom of said hopper into a pit car, means to operate said second conveyor, means to render said second conveyor inoperative without rendering the first named conveyor inoperative, said first named conveyor being mounted on said hopper for horizontal swinging movement relative thereto, and power operated means to selectively rotate said hopper and to horizontally swing the first named conveyor relative to the hopper so as to cause the conveyors to assume angular positions relative to each other.

15. A loading machine including a wheeled support, a storage hopper mounted on said support for horizontal rotation, an inclined conveyor to move material from a point adjacent the ground into said hopper and having its discharge end mounted on said hopper to swing horizontally relative to the latter, and a second inclined conveyor rigid with said hopper to discharge material from the bottom of the latter into a pit car.

16. In a loading machine, a wheeled support having a hopper mounted thereon, an open horizontal frame mounted on the hopper, an inclined conveyor having its rear upper end pivotally connected to said horizontal frame for vertical swinging movement, yieldable power operated means carried by the frame and including a flexible hoisting member associated with said conveyor to vertically swing the latter, and gathering means on the forward end of said conveyor to deliver material to the latter from the ground.

17. A loading machine including a wheeled support having a hopper mounted thereon, a substantially horizontal open frame mounted on said hopper to rotate horizontally relative thereto, actuating mechanism carried by said frame, and an inclined conveyor operatively connected to said actuating mechanism and pivotally connected to the frame at its discharge end for vertical swinging movement, said conveyor being arranged to move material into said hopper and having means on its forward end to deliver material to the same from the ground, and a second conveyor to discharge the contents of said hopper into a pit car.

18. A loading machine including a wheeled truck, a storage hopper mounted directly on said truck for horizontal rotation relative to the truck, releasable means to restrain said hopper from rotation, a conveyor to move material from a point adjacent the ground into said hopper, a frame mounted on said hopper to swing horizontally and having said conveyor supported thereon, actuating means for said conveyor carried by said frame, a second conveyor rigid with said hopper to discharge material from the latter into a pit car, and actuating means for the second conveyor mounted on the truck at each side of said hopper.

19. A loading machine including a forward conveyor, a rear conveyor, a hopper between said conveyors, and means including an actuating member mounted on the rear conveyor to move a pit car relative to the discharge end of said rear conveyor to uniformly load the car, said means further including a car pusher fork carried by said actuating member.

20. A loading machine including a storage hopper, an open horizontal frame mounted on said hopper, actuating mechanism carried by said frame, an inclined conveyor arranged to move material into said hopper from a point adjacent the ground and operatively connected to said actuating mechanism, said conveyor being pivotally connected at its upper rear end to said frame for vertical swinging movement, means carried by said frame to vertically swing said conveyor, and manually controlled connections between said actuating mechanism and said conveyor swinging means.

21. A loading machine including a storage hopper, an open horizontal frame mounted on said hopper for horizontal rotation, actuating mechanism carried by said frame, a conveyor operatively connected to said actuating mechanism and mounted on said frame to deliver material from a point adjacent the ground into said hopper, and controllable means operatively associated with and actuated by said conveyor to horizontally rotate said frame and thereby horizontally swing said conveyor selectively to one side or the other.

22. In a loading machine, the combination with a conveyor to discharge material into a car, of an actuating means carried by said conveyor, and a car pusher fork operatively connected to said actuating means to move said car relative to the discharge end of said conveyor to uniformly load the car.

23. A loading machine including a wheeled support having a storage hopper mounted thereon, a forward inclined conveyor supported on said hopper and arranged to move material from a point adjacent the ground into said hopper, means to operate said conveyor, a second conveyor to discharge material from said hopper into a car and including a foot shaft, a pair of motors, one arranged at each side of said hopper and both operatively connected to the foot shaft of said second conveyor, and means at the discharge end of said second conveyor to throw said pair of motors into and out of operation.

24. A loading machine of the class described including a conveyor, and a gathering mechanism including substantially horizontally arranged arms and means to move said arms longitudinally to penetrate a pile of material and then laterally and rearwardly to engage said material and move it onto the conveyor, said arms including upwardly movable finger members.

25. A coal loading machine including a wheeled truck having a hopper mounted thereon, a horizontal elongated substantially rectangular frame mounted on said hopper for horizontal rotation, an inclined conveyor extending upward through said frame and arranged to move material from a point adjacent the ground into said hopper, said conveyor being mounted at its discharge end on said frame, a motor supported by said frame rearwardly of the discharge end of said conveyor and operatively connected to the head shaft of the latter, a pair of slip clutches supported by the frame beneath the discharge end of said conveyor and having hubs operatively connected to said conveyor and to each other, a single operating means associated with said slip clutches to simultaneously unclutch one of the latter and clutch the other, said slip clutches having casings in the forms of drums, and a flexible member associated with said hopper and said drums whereby said flexible member may be wound upon the drums selectively to swing the frame and the conveyor toward either side of the machine.

26. A coal loading machine comprising a wheeled truck having a hopper mounted thereon, an open elongated substantially rectangular frame mounted on said hopper, a motor carried by said frame, an inclined conveyor pivotally connected to the frame forwardly of the hopper and arranged to move material from a point adjacent the ground into said hopper, operating connections carried by the frame between the motor and the head shaft of the conveyor, a shaft mounted on the frame rearwardly of said motor and having the hub of a safety slip clutch secured thereto, such slip clutch including a casing operatively connected to the head shaft of said conveyor, drums secured upon the ends of said slip clutch carrying shaft, a cable extending forwardly from each of said drums, guides carried by the forward end of the frame and the conveyor around which said cable passes, said cable having its free end attached to the forward end of said frame, and means operable from either side of the machine to clutch or unclutch said safety slip clutch to effect the raising of said conveyor at will.

27. A coal loading machine comprising a wheeled truck having a hopper mounted thereon, an open elongated substantially rectangular frame mounted on said hopper, a motor carried by said frame, an inclined conveyor pivotally connected to the frame forwardly of the hopper and arranged to move material from a point adjacent the ground into said hopper, said conveyor having a head shaft operating connections carried by the frame between the motor and the head shaft of the conveyor, a shaft mounted on the frame rearwardly of said motor and having the hub of a safety slip clutch secured thereto, such slip clutch including casing operatively connected to the head shaft of said conveyor, drums secured upon the ends of said slip clutch carrying shaft, a cable extending forwardly from each of said drums, guides carried by the forward end of the frame and the conveyor around which said cable passes, said cable having its free end attached to the forward end of said frame, means operable from either side of the machine to clutch and unclutch said safety slip clutch to effect the raising of said conveyor at will, means to retain said drums against retrograde movement to hold the conveyor raised, and means at the forward end of the frame to release said retaining means from either side of the machine.

28. In a coal loading machine, a wheeled truck having a hopper mounted thereon, an open elongated substantially rectangular frame mounted horizontally upon said hopper for horizontal rotation, an inclined conveyor projecting upwardly through the forward end of said frame and pivotally connected adjacent its discharge end to said frame, said conveyor being arranged to move material from a point adjacent the ground into said hopper, a motor supported on the frame rearward of the discharge end of said conveyor, a shaft mounted transversely of the frame forwardly of the motor, operative connections between the motor and said shaft, a second shaft within the first named shaft and connected with the latter by means of a slip clutch, operative connections between the second named shaft and the head shaft of said conveyor, and a gathering mechanism at the forward lower end of said conveyor operatively connected to the foot shaft of the latter.

29. In a coal loading machine, a wheeled truck having a hopper mounted thereon, an open elongated substantially rectangular frame mounted horizontally upon said hopper for horizontal rotation, an inclined conveyor projecting upwardly through the forward end of said frame and pivotally connected adjacent its discharge end to said frame, said conveyor being arranged to move material from a point adjacent the ground into said hopper, a motor supported on the frame rearwardly of the discharge end of said conveyor, a shaft mounted transversely of the frame forwardly of the motor, operative connections between the motor and said shaft, a second shaft within the first named shaft and connected with the latter by means of a slip clutch, operative connections between the second named shaft and the head shaft of said conveyor, a gathering mechanism at the forward lower end of said conveyor operatively connected to the foot shaft of the latter, a shaft supported by the frame rearwardly of the motor and having a slip clutch hub splined thereon, a slip clutch casing operatively associated with said hub and operatively connected to the head shaft of said conveyor, means operated by the shaft mounted rearwardly of the motor to upwardly swing said conveyor, and manually operable means to clutch or unclutch the slip clutch carried by the shaft mounted rearwardly of the motor.

30. A coal loading machine including a hopper adjustable in height and having a conveyor arranged to move material into the same from a point adjacent the ground, a second conveyor arranged to discharge the contents of said hopper into a pit car and including a forward section rigid with the hopper and a rear section pivoted to the forward section for vertical swinging movement, and means to swing said rear section of the second conveyor to vary the height thereof.

31. A coal loading machine including a hopper adjustable in height and having a conveyor arranged to move material into the same from a point adjacent the ground, a second conveyor arranged to discharge the contents of said hopper into a pit car and including a forward section rigid with the hopper and a rear section pivoted to the forward section for vertical swinging movement, means to swing said rear section of the second conveyor to vary the height thereof, said means including castings depending from the second conveyor section in spaced relation and provided with socketed ends, internally threaded sockets having universal connection with said ends, a worm having right and left threads and engaging said sockets, and means to rotate said worm.

32. A coal loading machine comprising a wheeled truck having a hopper mounted thereon, a forward conveyor arranged to move material from a point adjacent the ground into said hopper, a frame mounted on said hopper and projecting forwardly of the latter, said conveyor being pivotally connected to said frame for vertical swinging movement, a drum at each side of said frame, a cable attached to each drum, means to rotate said drums, guides carried by the forward end of the frame and the conveyor and around which said cables pass, and yieldable means connecting the free end of said cables to the forward portion of said frame.

33. A coal loading machine comprising a wheeled support, a conveyor mounted on said support and arranged to discharge material into a pit car, a motor supported by and beneath said conveyor, a shaft supported by and beneath said conveyor transversely of the latter and operatively connected to said motor, an endless member arranged horizontally at one side of said conveyor and operatively connected to said shaft, and a car pusher fork carried by said endless member.

34. A loading machine of the class described including a conveyor, and an undermining gathering mechanism for the conveyor including a substantially horizontally arranged arm of pick blade formation and means to move said arm longitudinally to penetrate standing shattered coal and then laterally and rearwardly to engage behind said coal and then pull it down and move it onto the conveyor, said arm including a finger member pivoted for vertical swinging movement whereby it may yield for entering and following the crevices of the standing shattered coal.

In testimony whereof I affix my signature.
JOSEPH F. JOY.